(12) United States Patent
Suzuki

(10) Patent No.: US 8,441,252 B2
(45) Date of Patent: May 14, 2013

(54) ROTATIONAL ANGLE MEASUREMENT APPARATUS

(75) Inventor: Mutsumi Suzuki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 367 days.

(21) Appl. No.: 12/946,914

(22) Filed: Nov. 16, 2010

(65) Prior Publication Data
US 2011/0115477 A1    May 19, 2011

(30) Foreign Application Priority Data

Nov. 17, 2009 (JP) ................. 2009-261472

(51) Int. Cl.
*G01R 33/06* (2006.01)
(52) U.S. Cl.
USPC .................. 324/207.21; 324/207.25; 324/200
(58) Field of Classification Search .......... None
See application file for complete search history.

(56) References Cited

U.S. PATENT DOCUMENTS

| | | | | |
|---|---|---|---|---|
| 6,448,763 B1* | 9/2002 | Spellman | ................. | 324/207.21 |
| 6,633,462 B2 | 10/2003 | Adelerhof | | |
| 8,258,782 B2* | 9/2012 | Kaita et al. | ............... | 324/207.25 |

| | | | |
|---|---|---|---|
| 2008/0116886 A1 | 5/2008 | Yamada et al. | |
| 2009/0058407 A1 | 3/2009 | Kanekawa et al. | |
| 2010/0219822 A1 | 9/2010 | Suzuki et al. | |

FOREIGN PATENT DOCUMENTS

| | | |
|---|---|---|
| EP | 1 918 678 | 5/2008 |
| JP | 3799270 | 4/2006 |
| JP | 2006-194861 | 7/2006 |
| WO | WO 2006/070305 | 7/2006 |

OTHER PUBLICATIONS

U.S. Appl. No. 12/750,244.

\* cited by examiner

*Primary Examiner* — Jermele M Hollington
*Assistant Examiner* — Trung Nguyen
(74) *Attorney, Agent, or Firm* — Antonelli, Terry, Stout & Kraus, LLP.

(57) ABSTRACT

The object of the invention is to provide a rotational angle measurement apparatus that is capable of correcting an error due to pin-angle error with a small amount of calculation operation. The rotational angle measurement apparatus includes a magnetic sensor 301 and a signal processing unit 303M. The magnetic sensor includes two bridges comprising magneto-resistance elements each having a pinned magnetic layer. A ratio-calculation unit 381 of the signal processing unit 303M calculates a ratio Vy/Vx of output signals Vx and Vy. A parameter correction unit 382 subtracts a predetermined correction parameter β from the ratio Vy/Vx calculated by the ratio-calculation unit. An a tan-processing unit 383 conducts arctangent processing on the value calculated by the parameter correction unit and calculates an angle of magnetic field θ.

20 Claims, 21 Drawing Sheets

ROTATIONAL ANGLE MEASUREMENT APPARATUS

BACKGROUND OF THE INVENTION

1. Field of the Invention

The present invention relates to a rotational angle measurement apparatus including a magneto-resistance element (MR element) having a pinned magnetic layer. The invention particularly relates to a rotational angle measurement apparatus capable of correcting a pin-angle error.

2. Description of the Related Art

A rotational angle measurement apparatus using such an MR element is known, for example, by Japanese Patent No. 3799270, etc.

Examples of known magneto-resistance elements (MR element) include a giant magneto-resistance element (GMR element) and a tunneling magneto-resistance element (TMR element). The outline of MR element is to be described by way of a magnetic field measurement apparatus using a GMR element as an example.

FIG. 1 shows a basic structure of the GMR element.

The GMR element has a first magnetic layer 13 (pinned magnetic layer) and a second magnetic layer 11 (free magnetic layer) in which a non-magnetic layer 12 (spacer layer) is sandwiched between both of the magnetic layers. When an external magnetic field is applied to the GMR element, while the magnetization direction of the pinned magnetic layer does not change and remains fixed as it is, the magnetization direction 20 of the free magnetic layer changes in accordance with the direction of the external magnetic field.

The angle of magnetization direction in the pinned magnetic layer is referred to as a pin angle and represented by θp.

When a voltage is applied across the end of the GMR element, a current flows in accordance with the resistance of the element, and the magnitude of the resistance of the element changes depending on the difference: Δθ=θf−θp between the magnetization direction (pin angle) θp of the pinned magnetic layer and the magnetization direction θf the free magnetic layer. Accordingly, when the magnetization direction θp of the pinned magnetic layer is known, the magnetization direction θf the free magnetic layer, that is, the direction of the external magnetic field can be detected by measuring the resistance value of the GMR element with the use of the property described above.

The mechanism in which the resistance value of the GMR element changes according to Δθ=θf−θp is as described below.

The magnetization direction in the thin-film magnetic film is concerned with the direction of electrons' spin in a magnetic material. Accordingly, in the case where Δθ=0, for the electrons in the free magnetic layer and the electrons in the pinned magnetic layer, the ratio of electrons with the directions of spins being identical is high. By contrast, in the case where Δθ=180°, the ratio of electrons with the directions of the spins opposite to each other is high for the electrons in both of the magnetic layers.

FIG. 2 schematically shows a cross section of the free magnetic layer 11, the spacer layer 12, and the pinned magnetic layer 13. Arrows shown in the free magnetic layer 11 and the pinned magnetic layer 13 schematically show the direction of the spin for majority electrons.

FIG. 2A shows a case where Δθ=0 in which the directions of spins are aligned in the free magnetic layer 11 and the pinned magnetic layer 13. FIG. 2B shows a case where Δθ=180° in which the directions of spins are opposite to each other in the free magnetic layer 11 and the pinned magnetic layer 13.

In the case of θ=0 in FIG. 2A, since electrons of an identical spin direction are predominant in the free magnetic layer 11, the right spin electrons emitting from the pinned magnetic layer 13 are less scattered in the free magnetic layer 11 and pass along the trajectory as an electron trajectory 810.

On the other hand, in the case of Δθ=180° in FIG. 2B, electrons of right spin emitting from the pinned magnetic layer 13 are scattered more frequently and pass along the trajectory as an electron trajectory 810 when entering the free magnetic layer 11, since there are many electrons of opposite spin. As described above, in the case where Δθ=180°, since electrons are scattered more frequently, electric resistance is increased.

In an intermediate case where AO is in the range between 0 and 180°, it is in an intermediate state between FIG. 2A and FIG. 2B. The resistance value R of the GMR element is represented as:

[Equation 1]

$$R = R'_0 + \frac{G}{2}(1 - \cos\Delta\theta) = R_0 - \frac{G}{2}\cos\Delta\theta \quad (1)$$

in which G/R is referred to as a GMR coefficient which is from several % to several tens %.

Since way of current flow (that is, electric resistance) can be controlled depending on the direction of the electrons' spin, the GMR element is also referred to as a spin-valve device.

Further, in a magnetic film of thin film thickness (thin-film magnetic film), since the demagnetizing factor in the direction normal to the surface is extremely large, the magnetization vector cannot rise vertically in the normal direction (direction of film thickness) and lies in the plane. Since both of the free magnetic layer 11 and the pinned magnetic layer 13 constituting the GMR element are sufficiently thin, respective magnetization vectors lie in the in-plane direction.

FIG. 3A shows a case where a Wheatstone bridge 60A is formed by using four GMR elements R1 (51-1) to R4 (51-4). The bridge 60A is used as a magnetic sensor.

In this case, the magnetization direction in the pinned magnetic layer of the GMR element R1 (51-1) and R3 (51-3) is set as θp=0, and the magnetization direction in the pinned magnetic layer of the GMR element R2 (51-2) and R4 (51-4) is set as θp=180°. Since the magnetization direction θf in the free magnetic layer is determined by an external magnetic field, and the magnetization direction θf is identical for four GMR elements. Therefore, a relation: Δθ2=θf−θp2=θf−θp1−π=Δθ1+π is established. Since Δθ1 is based on θp=0, it is substituted as: Δθ1=θ. Accordingly, as can be seen from the equation (1), the GMR elements R1, R3 are each represented by:

[Equation 2]

$$R_n = R_{n0} - \frac{G}{2}\cos\theta \quad (2)$$

in which (n=1, 3), and the GMR elements R2, R4 are each represented by:

[Equation 3]

$$R_n = R_{n0} + \frac{G}{2}\cos\theta \quad (3)$$

in which (n=2, 4).

When an excitation voltage e0 is applied to a bridge 60A, a differential voltage Δv=V2−V1 between terminals V1 and V2 is represented by the following equation (4):

[Equation 4]

$$\Delta v = \frac{R_1 R_3 - R_2 R_4}{(R_1 + R_4)(R_2 + R_3)} e_0 \quad (4)$$

When substituting the equation (2) and the equation (3) into the equation (4), assuming Rn0 as equal for n=1 to 4, and setting as: R0=Rn0, it is represented as:

[Equation 5]

$$\Delta v_c = \frac{-e_0 G \cos\theta}{2R_0} \equiv -V_x \quad (5)$$

As described above, since the signal voltage Δv is in proportion to cos θ, the direction θ of the magnetic field can be detected. Further, since the bridge outputs a signal in proportion to cos θ, it is referred to as a COS bridge.

Further, FIG. 3B shows a bridge 60B in which the direction in the pinned magnetic layer is changed by 90° from that of the COS bridge in FIG. 3A. That is, the bridge is constructed with GMR elements at θp=90° and 270°. By calculating in the same manner as described above, we obtain the signal voltage as follows:

[Equation 6]

$$\Delta v_s = \frac{e_0 G \sin\theta}{2R_0} \equiv V_y \quad (6)$$

Since the signal voltage is in proportion to sin θ, the bridge 60B is referred to as a SIN bridge.

By calculating the arctangent for the ratio of two output signals of the COS bridge and the SIN bridge, the direction θm of the magnetic field vector (angle of magnetic field) is determined as:

[Equation 7]

$$\text{ArcTan}\left(\frac{\Delta v_s}{-\Delta v_c}\right) = \text{ArcTan}\left(\frac{V_y}{V_x}\right) = \text{ArcTan}\left(\frac{\sin\theta}{\cos\theta}\right) = \theta \quad (7)$$

As described above, the magneto-resistance element has a feature capable of directly detecting the direction of the magnetic field.

The magnetic field dependent term for the resistance of the magneto-resistance element is determined by the difference Δθ=θm−θp between the magnetization direction (pin angle) θp of the pinned magnetic layer and the angle of the external magnetic field θm as shown in the equation (1). In other words, the pin angle θp is a reference angle. Accordingly, when the setting for the pin angle includes an error, the equation (5) and the equation (6) are not valid and the angle determined according to the equation (7) no more shows an exact angle of magnetic field θm.

As an example, it is assumed that the pin angle of the GMR elements R2, R4 of the COS bridge shown in FIG. 3A is deviates by 0.5° from the respective correct angle, and the pin angle of the GMR elements R2, R4 of the SIN bridge shown in FIG. 3B deviates by −1°.

FIG. 4 shows a difference (i.e. measurement error) between the angle θ1 determined from signals Vx and Vy from each of the bridges in accordance with the equation (7) and a real angle of the magnetic field θm in the case described above. The measurement error changes depending on the real angle of magnetic field θm and has amplitude of about 1°. As described above, the pin-angle error of 1° corresponds to an angle measurement error of about 1°. Accordingly, in order to obtain measurement accuracy, for example, of ±0.2°, it is necessary to set all pin angles at an accuracy of about 0.2°.

A method of manufacturing a magnetic sensor having a plurality of pin angles therein includes, for example, a method of arranging magneto-resistance elements (corresponding to each of Ri (i=1 to 4) in FIG. 3) or a method of changing the direction of the external magnetic field applied upon depositing the pinned magnetic layer. However, in any of the methods, it is extremely difficult to set all pin angles each at a high accuracy of about 0.2°.

Concerning to this problem, a method of correcting an angle measurement error caused by the pin-angle error has been known (for example, refer to JP-2006-194861-A).

In JP-2006-194861-A, a rotational angle θ and a measurement angle θ(meas) measured by a magnetic sensor at this instance are measured, and then an error Δϕ(θ) between both of them is determined as function of the rotational angle θ. That is, the error is represented as:

[Equation 8]

$$\Delta\phi(\theta) = \theta(\text{meas}) - \theta \quad (8)$$

Then, since the error Δϕ(θ) is in the form of a 180° cycle as shown in FIG. 4, correction function S1 (θ, α) is defined as shown by the equation (9) as:

[Equation 9]

$$S1(\theta, \alpha) = \frac{\alpha}{2}(1 + \cos 2\theta) \quad (9)$$

Then, a parameter α is determined such that a function E1 (α) defined by the following equation (10) is minimum:

[Equation 10]

$$E1(\alpha) = \int [\Delta\phi(\theta) - S1(\theta, \Delta)]^2 d\theta \quad (10)$$

where integration is a 1 cycle integration for θ=0 to 360°.

After the error of a second harmonic component is removed as described above, a fourth harmonic component is left. Then, the correction function S2(θ, β) for fourth harmonic is defined as shown in the following equation (11);

[Equation 11]

$$S2(\theta, \beta) = -\beta \sin 4\theta \quad (11)$$

Then, a parameter β is determined such that a function E2 (β) defined by the following equation (12) is minimum:

[Equation 12]

$$E2(\beta) = \int [\Delta\phi(\theta) - S1(\theta,\alpha) - S2(\theta,\beta)]^2 d\theta \quad (12)$$

During operation of the magnetic sensor, the error is corrected by using the correction function determined as described above according to the following equation

[Equation 13]

$$\theta(\text{compensated}) = \theta(\text{meas}) - S1(\theta,\alpha) - S2(\theta,\beta) \quad (13)$$

SUMMARY OF THE INVENTION

As described above, the magnetic field measurement apparatus using the magneto-resistance element having the pinned magnetic layer involves a problem that error occurs in the measured angle when there is a setting error for the magnetization direction of the pinned magnetic layer (pin angle).

Concerning to this problem, the correction method described in JP-2006-194861-A involves three problems.

(1) First, the amount of calculation operation is enormous for obtaining the correction parameters α and β, since integrations E1 and E2 are minimized by repeating the integrations E1 and E2 while changing α and β.

(2) Secondly, since the correction functions S1 and S2 are functions of 2θ and 4θ, an absolute value for the angle of magnetic field is necessary for the correction, and it requires a control device with a known angle, such as an encoder.

(3) Thirdly, since the correction equation (13) used during sensor operation includes a plurality of trigonometric functions, which require much amount of operation, the amount of calculation operation is large to necessitate a high speed microcontroller or the like. The correction during the sensor operation requires high speed operation That is, the existent method of correcting the measurement error caused by the pin-angle error involves a problem that the amount of calculation operation required for correction is enormous.

The present invention intends to provide a rotational angle measurement apparatus capable of correcting an error caused by a pin-angle error with a small amount of calculation operation.

In the present specification, function SQRT(y) represents "Square root of y".

(1) To attain the purpose, the present invention provides a rotational angle measurement apparatus having a magnetic sensor and a signal processing unit, the magnetic sensor including two bridges that comprises magneto-resistance elements each having a pinned magnetic layer, and the signal processing unit receiving an output signal Vx from a first bridge as an input signal Vx and an output signal Vy from a second bridge as an input signal Vy and outputting an angle of magnetic field θ, in which the difference between a ratio Vy/Vx and a tan θ is a constant non-zero value when the absolute value |Vx| of the output signal Vx is larger than or equal to the absolute value |Vy| of the output signal Vy in the signal processing unit.

With the constitution as described above, an error caused by a pin-angle error can be corrected with a small amount of operation.

(2) Assuming the constant value as x in (1) described above, the constant value x preferably satisfies (1/SQRT(1−x²))×(Vy/Vx)−tan θ=x and the constant value x does not depend on the θ. In the present specification, a function SQRT (y) represents "square root of y".

(3) The signal processing unit in (1) described above preferably includes a ratio-calculation unit that calculates the ratio Vy/Vx of the output signals Vx, Vy, a parameter correction unit that subtracts a predetermined correction parameter β from the ratio Vy/Vx calculated by the ratio-calculation unit, and an a tan-processing unit that conducts an arctangent processing on the value calculated by the parameter correction unit and calculates the angle of magnetic field θ.

(4) The parameter correction unit in (3) described above preferably divides the calculated value by Bx=SQRT(1−(β²)).

(5) The apparatus in (3) described above preferably includes an offset-subtraction unit that subtracts predetermined offsets bx and by from the output signal Vx of the first bridge and the output signal Vy of the second bridge respectively, in which the output signal from the offset-subtraction unit is inputted to the ratio-calculation unit of the signal processing unit.

(6) In (3) described above, the signal processing unit preferably includes an averaging unit that calculates the correction parameter β from an average value for the duration in which the direction of the magnetic field turns for one rotation relative to the ratio Vy/Vx calculated by the ratio-calculation unit.

(7) The apparatus in (6) described above preferably includes a window function processing unit that multiplies the ratio Vy/Vx calculated by the ratio-calculation unit by a window function W(r) having the ratio Vy/Vx as an argument, in which the averaging unit calculates the average value relative to the output from the window function processing unit for the duration in which the direction of the magnetic field turns for one rotation.

(8) In (7) described above, the window function W(r) is an even function.

(9) In (7) described above, the parameter correction unit preferably divides the calculated value by Bx=SQRT(1−β²)

(10) In (1) described above, the magneto-resistance element is preferably a giant magneto-resistance element.

(11) The present invention provides, for attaining the aforementioned purpose, a rotational angle measurement apparatus comprising a magnetic sensor and a signal processing unit, the magnetic sensor including two bridges comprising magneto-resistance elements each having a pinned magnetic layer, the signal processing unit receiving an output signal Vx from a first bridge as an input signal Vx and an output signal Vy from a second bridge as an input signal Vy, and outputting an angle of magnetic field θ, in which the signal processing unit includes an averaging unit that calculates the correction parameter β from an average value for the duration in which the direction of the magnetic field turns for one rotation relative to the ratio Vy/Vx of the output signal.

With the constitution described above, an error caused by a pin-angle error can be corrected with a small amount of operation.

(12) In (11) described above, the apparatus preferably includes a window function processing unit that multiplies a window function W(r) having the ratio r (=Vy/Vx) as an argument to the ratio Vy/Vx calculated by the ratio-calculation unit, in which the averaging unit calculates an average value relative to the output from the window function processing unit for the duration in which the direction of the magnetic field turns for one rotation.

(13) The apparatus in (11) described above, preferably includes an offset-subtraction unit that subtracts predetermined offsets bx and by from the output signal Vx of the first bridge and the output signal Vy of the second bridge respectively, in which the output signal from the offset-subtraction unit is inputted to the ratio-calculation unit of the signal processing unit.

(14) In (13) described above, the averaging unit preferably determines the offset voltages bx, by upon first rotation during twice rotation of the magnetic field at a constant angular velocity, and the offset-subtraction unit preferably calculates values Vx'=Vx−bx and Vy'=Vy−by obtained by subtracting the offset voltages bx, by from the signals Vx, Vy respectively, and the averaging unit preferably determines the amount of pin-angle error β for the values Vx', Vy' upon second rotation of the magnetic field.

(15) In (11) described above, the magneto-resistance element is preferably a giant magneto-resistance element.

According to the invention, the error caused by the pin-angle error can be corrected with a small amount of calculation operation.

DESCRIPTION OF THE PREFERRED EMBODIMENTS

The constitution and the operation of a rotational angle measurement apparatus according to a first embodiment of the invention are to be described with reference to FIGS. 5 to 7.

First of all, a first constitution of the rotational angle measurement apparatus for examining a pin-angle error α according to this embodiment is to be described with reference to FIG. 5.

Following abbreviations are used in FIGS. 5, 8, 11, 13, 19, 20, 23, 24, and 25:
"ROT. AGL. MEA. APPR" stands for "rotational angle measurement apparatus"; "MAG.SENS" stands for "magnetic sensor"; "DETC.CKT" stands for "detection circuit unit"; "SIG.PROC" stands for "signal processing unit"; "AVR." stands for "averaging unit"; "DUR.DETM" stands for "duration-determination unit"; "MEM" stands for "parameter-storing unit".

Figure 5:
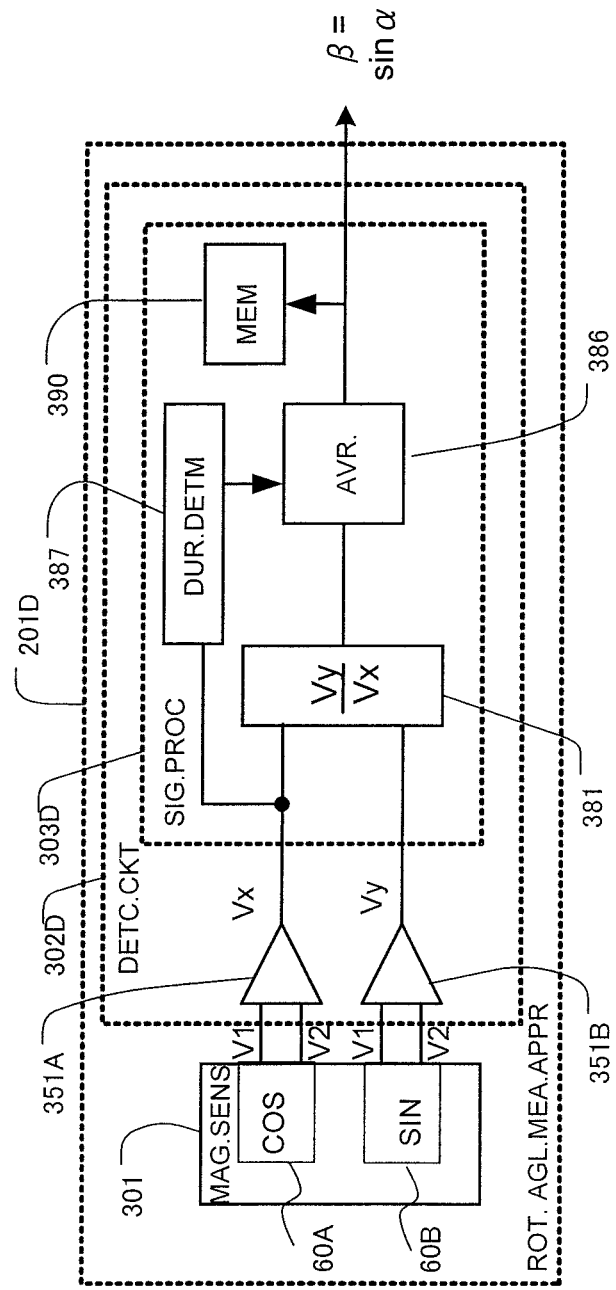
FIG. 5 is a block diagram showing a first constitution of a rotational angle measurement apparatus for examining a pin-angle error α according to a first embodiment of the invention.

FIG. 5 is a block diagram showing the first constitution of the rotational angle measurement apparatus for examining the pin-angle error α according to the first embodiment of the invention.

A rotational angle measurement apparatus 201D of this embodiment has a magnetic sensor 301 and a detection circuit unit 302D. The detection circuit unit 302D has a signal processing unit 303D. The magnetic sensor 301 has two bridges (COS bridge 60A and SIN bridge 60B) comprising GMR elements. A differential amplifier 351A detects a difference voltage between terminals V1 and V2 of the COS bridge to output a difference signal Vx, in which it is set as Vx=−ΔVc=−(V2−V1). A differential amplifier 351B detects a difference voltage between terminals V1 and V2 of the SIN bridge to output a difference signal Vy, in which it is set as Vy=ΔVs.

In the present specification, the difference signals Vx and Vy are referred to as output signals of the respective bridges.

The constitution of the magnetic sensor used in the rotational angle measurement apparatus according to this embodiment is to be described with reference to FIGS. 6A and 6B.

Figures 6A, 6B:
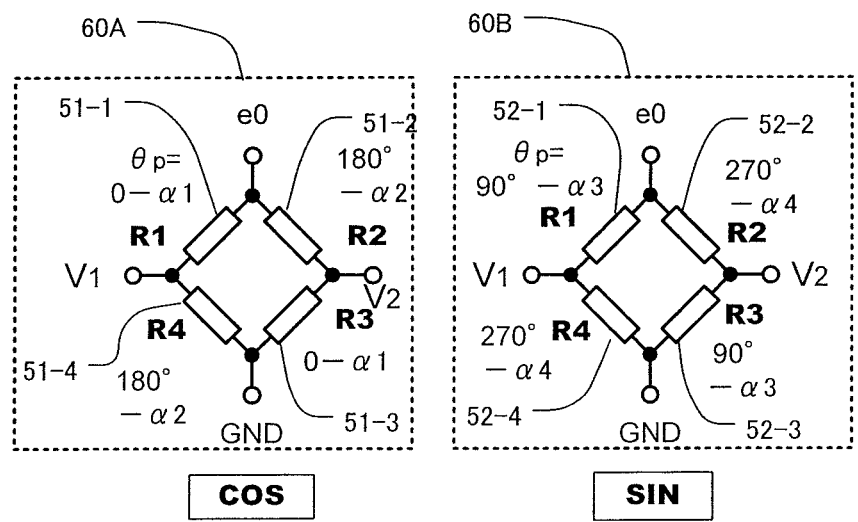
FIGS. 6A and 6B are constitutional view of a magnetic sensor used in the rotational angle measurement apparatus according to the first embodiment of the invention.

FIGS. 6A and 6B is a constitutional view of the magnetic sensor used in the rotational angle measurement apparatus according to the first embodiment of the invention.

The magnetic sensor used in this embodiment comprises a COS bridge 60A shown in FIG. 6A, and an SIN bridge 60B shown in FIG. 6B.

The pin angle of magneto-resistance elements R1 (51-1) and R3 (51-3) constituting the COS bridge 60A is set to θp=0, and the pin angle of the magneto-resistance elements R2 (51-2) and R4 (51-4) is set as: θp=180°.

The pin angle of magneto-resistance elements R1 (52-1) and R3 (52-3) constituting the SIN bridge 60B is set to θp=90°, and the pin angle of the magneto-resistance elements R2 (52-2) and R4 (52-4) is set as: θp=270°.

As described above, the actual magnetic sensor contains an error in the setting of the pin angle. The pin-angle error (error) of each of the magneto-resistance elements is assumed as αi (i=1 to 4). That is, as shown in FIGS. 6A and 6B, respective pin angles of the COS bridge are assumed as θp=0−α1, 180°−α2 and respective pin angles of the SIN bridge are assumed as θp=90−α3, 270°−α4.

The pin angle is set, for example, by setting the magnetization direction θp by applying an external magnetic field upon depositing a pinned magnetic layer. Accordingly, the pin-angle error αi of the magneto-resistance elements of an identical pin angle in each of the bridges is identical. Therefore, the model adapted to have four types of error αi in the pin-angle setting as shown in FIGS. 6A and 6B is valid without loss of generality.

In this embodiment, an error due to the pin-angle error is detected in the rotational angle measurement apparatus using the magnetic sensor having an error of the pin angle as shown in FIGS. 6A and 6B. Further, in other rotational angle measurement apparatus to be described later, an error due to the detected pin-angle error is corrected by the output rotational angle.

At first, it is described that the problem of four types of pin-angle errors αi (i=1 to 4) is attributable to the problem of one type of pin-angle error α.

At first, the effect of the error of two types of pin angles in the COS bridge shown in FIG. 6A is to be described.

Assuming n=1 in the equation (2), the magneto-resistance element R1 is represented as:

[Equation 14]

$$R_1 = R_{10} - \frac{G}{2}\cos(\theta + \alpha_1) \tag{14}$$

Assuming n=2 in the equation (3), the magneto-resistance element R2 is represented as:

[Equation 15]

$$R_2 = R_{20} + \frac{G}{2}\cos(\theta + \alpha_2) \tag{15}$$

Thus, the output signal ΔVc of the bridge is represented as in the following equation (16):

[Equation 16]

$$\frac{\Delta V_c}{e_0} = \frac{R_2 - R_1}{R_2 + R_1} \tag{16}$$
$$= \frac{1}{R_{10} + R_{20}}$$
$$\left[(R_{20} - R_{10}) + \frac{G}{2}\{\cos(\theta + \alpha_1) + \cos(\theta + \alpha_2)\}\right]$$

When a portion depending on the direction of the magnetic field is expanded and arranged, the following equation (17) can be obtained:

[Equation 17]

$$\cos(\theta+\alpha_1)+\cos(\theta+\alpha_2)=\cos\theta(\cos\alpha_1+\cos\alpha_2)-\sin\theta(\sin\alpha_1+\sin\alpha_2)=r\sin(\theta+\alpha_C) \tag{17}$$

Assuming A=cos α1+cos α2, B=sin α1+sin α2, and r=SQRT(A²+B²) in the equation (17), sin $\alpha_C$ is represented as:

[Equation 18]

$$\sin\alpha_C = \frac{B}{r} \tag{18}$$

In the specification, the function SQRT(y) represents "square root of y".

Then, the amplitude r of the equation (18) is estimated. In a case where α1=α2 (that is, no pin-angle error in the bridge), r=2. Further, in the case where the pin-angle error in the bridge is 4°, for example, α1=+2° and α2=−2°, r=2×0.9994, in which the amplitude difference is only 0.06%. This is a level that cannot be detected experimentally and therefore, in the case where the pin-angle error is 4°, there is no substantial amplitude variation. Also in the case where the α1=+5° and α2=−5° (pin-angle error of 10°), r=2×0.996 which is a level with no substantial amplitude variation. Accordingly, in the case where the pin-angle error in the bridge is 10° or less, there is no substantial amplitude variation, and therefore, only the phase variation should be taken into consideration.

The equation (18) showing the phase variation can be transformed as described below.

[Equation 19]
$$\sin\alpha_C = \frac{B}{r} \\ = \frac{2}{r}\sin\left(\frac{\alpha_1+\alpha_2}{2}\right)\cos\left(\frac{\alpha_1-\alpha_2}{2}\right) \\ \approx \sin\left(\frac{\alpha_1+\alpha_2}{2}\right) \quad (19)$$

Accordingly, it is represented as:

[Equation 20]
$$\alpha_C \approx \frac{\alpha_1+\alpha_2}{2} \quad (20)$$

That is, it can be seen that the output signal of the COS bridge where a pin-angle error is present in the bridge may be considered on the coordinate system with the average value for two pin-angle errors as the angle origin. This is also applicable to the SIN bridge output.

In the following description, the angle origin of the coordinate system is referred to as "the reference angle of pinned magnetic layer of a bridge".

As can be seen from the result described above, the angle origin of the COS bridge 60A is αc represented by the equation (20), and the angle origin of the SIN bridge 60B moves to αs=(α3+α4)/2.

Figures 7A, 7B:
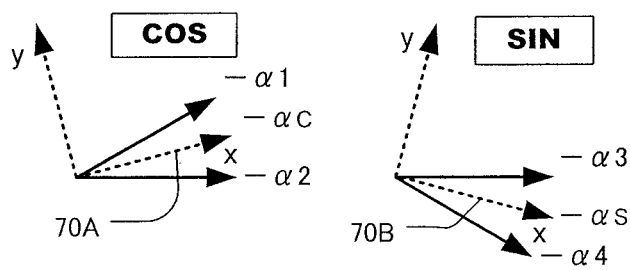
FIGS. 7A and 7B are schematic views showing the phase difference of each bridge in the magnetic sensor used in the rotational angle measurement apparatus according to the first embodiment of the invention.

FIG. 7 schematically shows the present situation. In FIG. 7, an effective coordinate axis is denoted by a dotted line. The X axis 70 of the effective coordinate axis acts as the reference angle of pinned magnetic layer of a bridge.

Referring to FIG. 7, the ratio between the signal Vx of the COS bridge and the signal Vy of the SIN bridge is represented by the following equation.

[Equation 21]
$$\frac{V_y}{V_x} = \frac{\sin(\theta'+\alpha_S)}{\cos(\theta'+\alpha_C)} = \frac{\sin(\theta+\alpha)}{\cos\theta} \quad (21)$$

in which α=αs−αc.

As described above, also when 4 types of pin-angle error αi (i=1 to 4) are included, correction can be made by the pin angle α represented by the equations (20) and (21).

In this case, we put θ=θ'+αc, and therefore, αc is unknown. αc can be determined easily by correlating the origin of the rotational angle measurement apparatus with the system origin of an equipment to which the rotational sensor is applied.

From the result described above, signals from the COS bridge having the pin-angle errors α1, α2, and signals from the SIN bridge having the pin-angle errors α3, α4 can be defined by the following equations (22) and (23).

[Equation 22]
$$\Delta V_c = -C\frac{G}{2}\cos\theta \quad (22)$$

[Equation 23]
$$\Delta V_s = +C\frac{G}{2}\sin(\theta+\alpha) \quad (23)$$

in which C is a proportional constant, α=αs−αc, αc=(α1+α2)/2, and αs=(α3+α4)/2.

Assuming as; Vx=−ΔVc, and Vy=ΔVs and determining the ratio Ryx of Vx and Vy, the ratio is defined as:

[Equation 24]
$$R_{yx} = \frac{V_y}{V_x} = \frac{\sin(\theta+\alpha)}{\cos\theta} \quad (24)$$

When a sin function for the numerator is expanded, the following equation (25) can be obtained.

[Equation 25]
$$R_{yx} = \frac{V_y}{V_x} \\ = \frac{\sin\theta\cos\alpha + \cos\theta\sin\alpha}{\cos\theta} \\ = \tan\theta\cos\alpha + \sin\alpha \quad (25)$$

Since tan θ is an odd function, the first term is reduced to zero by averaging the equation (25) over a range of θ=0 to 360°, and therefore, sin α is determined. This is represented by the equation:

[Equation 26]
$$\text{average}(R_{yx},[0,2\pi))=\sin\alpha\equiv\beta \quad (26)$$

Here, average( ) represents a processing for averaging the first argument in the interval of the second argument. The averaging interval [0, 2π) shows "starting from 0 to just before 2π". 2π is not included so as to avoid double calculation with a case of θ=0.

According to the equation (26), a pin-angle error α to be determined is obtained. It is set in this embodiment as β=sin α. As will be described later, when correction is conducted based on the pin-angle error α during the operation of the GMR rotational sensor, β=sin α is used. Accordingly, in the actual correction, it may suffice to determine β and arcsine calculation is not necessary.

As can be seen from the equation (25), a barycenter for the ratio Ryx is determined in the equation (26). Accordingly, in the equation (25), the equation (26) may be averaged by sampling at an equal interval with respect to θ. For example, Ryx may be sampled at a constant time interval while rotating a magnetic field generator at a constant angular velocity.

In the actual calculation of a correction coefficient, since Ryx diverges infinitely in the vicinity of Vx=0 in the equations (25) and (26), a conditional operation based on absolute values of Vx and Vy is introduced. That is, it is conditioned as:

[Equation 27]

$$\text{if } (|V_x| > |V_y|) \text{ then average}\left(\frac{V_y}{V_x}, [0, 2\pi]\right) = \sin\alpha \equiv \beta \quad (27)$$

In the equation (27), since one-half of sampling points is taken in the interval [0, 2π), the value for the equation (27) is equal to β=sin α in view of the nature of an odd function of tan θ in the equation (23).

Then, the constitution and the operation of the signal processing unit 303D are to be described again with reference to FIG. 5.

The output signal Vx of the COS bridge, that is, the output signal Vx of the differential amplifier 351A is defined as the input signal Vx to the signal processing unit 303D, and the output signal Vy of the SIN bridge, that is, the output signal Vy of the differential amplifier 351B is defined as the input signal Vy to the signal processing unit 303D.

The signal processing unit 303D has a ratio-calculation unit 381, an averaging unit 386, a duration-determination unit 387, and a parameter-storing unit 390.

The ratio-calculation unit 381 receives the input signals Vx, Vy inputted to the signal processing unit 303D and calculates the ratio Vy/Vx. Specifically, the signals Vx, Vy are inputted to an A/D converter of a microcontroller and the ratio-calculation unit 381 may be disposed in the microcontroller. Upon calculation of the ratio Vy/Vx, the calculation error can be reduced by the conditional branching based on comparison of the absolute values as shown in the equation (27).

Then, the averaging unit 386 receives the ratio r=Vy/Vx and averages the same. Averaging is conducted for the duration in which the direction of the magnetic field turns for one rotation. To detect the rotational duration, the duration is determined by using a duration-determination unit 387. Specifically, the duration is determined as one duration till which the voltage of the signal Vx twice passes the value equal to the starting voltage. Since the signal Vx is in proportion to a cos θ, twice passage through the identical value corresponds to 1 cycle. As shown in the equation (27), the average value is equal to the sine of the angle error α (β=sin α).

Duration for averaging processing may also be the duration in which the direction of the magnetic field rotates for a plurality of times. When the averaging duration is an integer multiple of 360°, that is, [0, 2Nrπ), the obtained average value is equal to the sine of the pin-angle error α (β=sin α), since the first term in the equation (25) is reduced to zero. Nr is an integer of 1 or greater, which is the number of cycle for the rotation of the direction of the magnetic field. Further, when the magnetic field is rotated by plural times, since the number of sampling points of data to be averaged increases, this provides an effect of improving the calculation accuracy for the β value.

The thus obtained β value (sine value for the pin-angle error α) is stored in the parameter-storing unit 390.

The step of obtaining the parameter by determining the pin-angle error α as described above in this embodiment has the following features.

(a) In the step of determining the amount of pin-angle error α (FIG. 5), the value of the angle origin is not required. This is because the output signal of the COS bridge having pin-angle errors in the bridge can be processed on the coordinate system whose angle origin is the average value for the two pin-angle errors. Accordingly, no encoder is required, and it may suffice to conduct sampling at a constant time interval by rotating a magnet at a constant velocity. Therefore, on-site correction in a state assembled in an application system is also possible.

(b) Since the calculation for trigonometric function is not necessary, the amount of calculation operation is small.

(c) Since parameter fitting is not conducted, α value is determined uniquely.

As described above, according to this embodiment, correction of an error generated due to the pin-angle error of the rotational angle measurement apparatus can be attained without using an encoder for calibration.

The calculation for the pin-angle error can be corrected with a small amount of calculation operation.

The constitution and the operation of a rotational angle measurement apparatus according to a second embodiment of the invention are to be described with reference to FIGS. 8 to 10.

First, a first constitution of the rotational angle measurement apparatus for correcting the pin-angle error α according to this embodiment is to be described with reference to FIG. 8.

Figure 8:
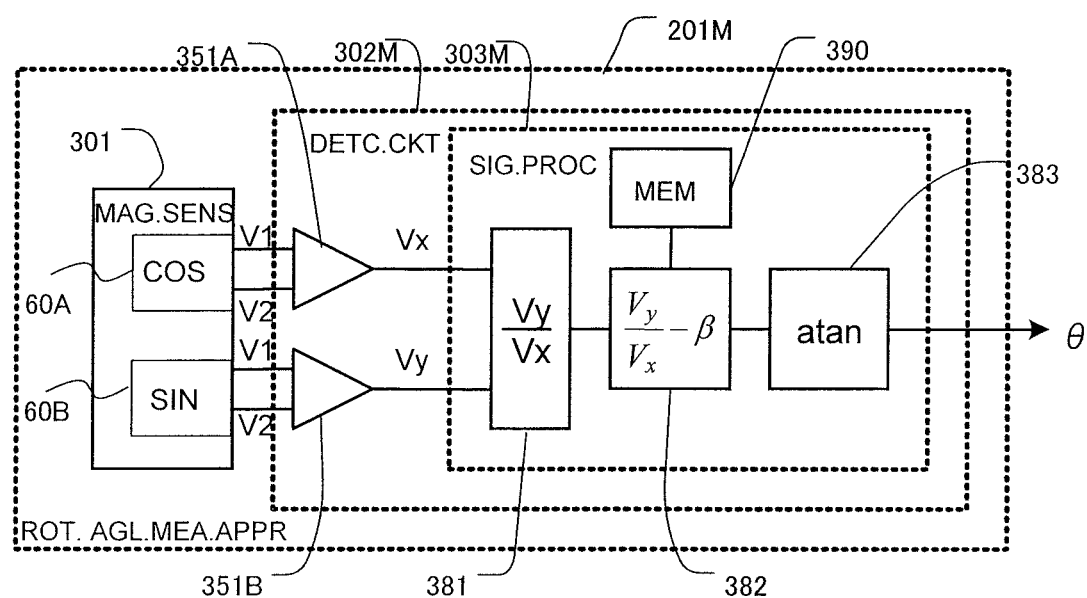
FIG. 8 is a block diagram showing a first constitution of a rotational angle measurement apparatus for correcting a pin-angle error α according to a second embodiment of the invention.

FIG. 8 is a block diagram showing the first constitution of the rotational angle measurement apparatus for correcting the pin-angle error α according to the second embodiment of the invention.

FIG. 8 shows a circuit constitution for executing correction processing during operation as a rotational angle sensor in which a rotational angle measurement value is corrected by using the sine β (=sin α) of the error α determined by the constitution of FIG. 5.

A rotational angle measurement apparatus 201M of this embodiment includes a magnetic sensor 301 and a detection circuit unit 302M. The detection circuit unit 302M has a signal processing unit 303M. The magnetic sensor 301 has two bridges (COS bridge and SIN bridge) each comprising GMR elements. A differential amplifier 351A detects a difference voltage between terminals V1, V2 of the COS bridge and outputs a difference signal Vx. In the same manner, a differential amplifier 351B detects a difference voltage between terminals V1 and V2 of the SIN bridge and outputs a difference signal Vy. In the present specification, the difference signals Vx and Vy are referred to as output signals of the respective bridges. The bridge output signals Vx and Vy are input signals Vx and Vy inputted to the signal processing unit 303M.

A ratio-calculation unit 381 receives input signals Vx and Vy inputted to the signal processing unit 303M and determines a ratio Vy/Vx. Specifically, the signals Vx and Vy are inputted to an A/D converter of a microcontroller and a ratio-calculation unit 381 may be disposed in the microcontroller. Then, a parameter correction unit 382 reads out a correction parameter β stored in a parameter-storing unit 390 and conducts the correction processing. Specifically, the parameter β is subtracted from the ratio Vy/Vx. Then, an a tan-processing unit 383 conducts arctangent processing to calculate an angle of magnetic field θ.

The a tan-processing unit 383 calculates an angular value θ corrected for the pin-angle error by the calculation as follows:

[Equation 28]

$$\theta = \text{ArcTan}\left(\frac{V_y}{V_x} - \beta\right) \quad (28)$$

In this specification, the processing of the equation (28) is deemed to be a processing of appropriately outputting a value in the 4-quadrant over θ=0 to 360° as shown in the following equation. That is, θ is equivalent to the following equation (29).

[Equation 29]

$$\theta = a\tan 2(V_y - \beta V_x, V_x) \quad (29)$$

θ=a tan 2 (y, x) is a function of appropriately outputting the value: θ=0 to 360° (or −180 to 180°) depending on whether the arguments x, y are positive or negative. For example, when both of x and y are positive, a tan 2 (y, x)=ArcTan (y/x), whereas when both of x and y are negative, a tan 2 (y, x)=ArcTan (y/x)+180°.

The a tan-processing unit 383 conducts the processing of the equation (29).

The equation (28) is equivalent to approximation of cos α=1 in the equation (25). According to the inventor's study, this approximation is effective in the case of |α|≦4°. This is to be described later with reference to data.

That is, the correction method by the circuit in FIG. 8 is particularly preferred since a sufficient accuracy can be obtained when the method is applied to a case where the difference α of the reference angle of the pinned magnetic layer of each bridge in the magnetic sensor is 4° or less.

As described above, the correction processing during a sensing operation in the correction method of the embodiment has the following features.

(a) The operation added to the correction processing is only the subtraction of the β value, and therefore, the burden on the correction operation process during sensing operation that requires real-time response is extremely small.

(b) Since the correction value β does not depend on the angle of magnetic field θ, the angle origin is not required in the correction processing. Accordingly, even when the angle origin has an error, the output angle value is correct as a relative value.

As apparent from FIG. 8 and the equation (28), the feature of this embodiment is to obtain more correct angular value θ corrected for the error due to the pin-angle error by subtracting a constant value (β) from the ratio of the output signals Vx and Vy from the COS bridge and the SIN bridge respectively. In a case where the β value is negative, a constant value is added.

In the foregoing and subsequent descriptions, the output signal Vx from the bridge means the difference signal Vx=V1−V2 between the terminals V1 and V2 of the bridge, or a signal obtained by multiplying an appropriate amplification factor to the difference signal. In FIG. 8, this signal corresponds to the output signal of the differential amplifier 351A. The output signal Vy of the SIN bridge is a difference signal Vy=V2−V1 or a signal obtained by multiplying an appropriate amplification factor to the difference signal.

Assuming the angle outputted from the rotational angle measurement apparatus in this embodiment as θ, tan θ is (Vy/Vx−β) as shown in the equation (28). Accordingly, the difference between the ratio Vy/Vx of the output signals from the COS bridge and the SIN bridge, and the tan θ for the output value θ of the rotational angle measurement apparatus is a constant non-zero value (not zero) (β) not depending on the rotational angle. That is, when taking notice on the relation between the input and the output of the signal processing unit 303M shown in FIG. 8, the input signals are Vx and Vy, and the output thereof is θ. Then, the difference between the ratio Vy/Vx of the input signals and the tan θ of the output signal is β. As can be seen from the equation (28), β is a constant non-zero value not depending on the rotational angle. Therefore, the correction method shown in FIG. 8 and represented by the equation (28) is equivalent to that the difference between the ratio Vy/Vx of the input signals to the signal processing unit 303M and the tan θ for the output value θ of the rotational angle measurement apparatus is the constant non-zero value (that is not zero) (β) not depending on the rotational angle.

Since β=0 corresponds to a case in which the correction processing is not conducted, when the process of this embodiment is conducted, the β value is a constant non-zero value.

While the relation between the equation (28) and the equation (29) is correct, the ratio Vy/Vx diverges as Vx approaches zero. Accordingly, the calculation error increases when the calculation is conducted with a finite digit number. Further, when the circuit operation is tested, the effect of the measurement error is expanded. Then, in the case of |Vx|<|Vy|, the equation (24) is transformed as in the following equation (30) by using the ratio r2=Vx/Vy.

[Equation 30]

$$(1 - \beta r_2) \cot \theta = r_2 \quad (30)$$

That is, for testing the operation of the circuit in FIG. 8, the equation (28) may be used in the case of |Vx|≧|Vy| and the equation (30) may be used in the case of |Vx|<|Vy|. Then, the operation can be tested with a minimum effect of the calculation error or the measurement error. Since the relation using the a tan 2 function of the equation (29) contains conditional branching process depending on the magnitude relation of |Vx|, |Vy| in the internal algorithm of the a tan 2 function, equation (29) is valid in any of the cases.

While a constitution in which the differential amplifiers 351A and 351B are included in the detection circuit unit 302M is shown in FIG. 8, it may be constituted such that the differential amplifiers 351A and 351B are included in the magnetic sensor 301 and the output signals Vx and Vy are transmitted by way of wirings and inputted to the detection circuit unit 302M. The constitution described above less undergoes the effect of external noises by lowering the impedance of output from the differential amplifier.

Figure 9:
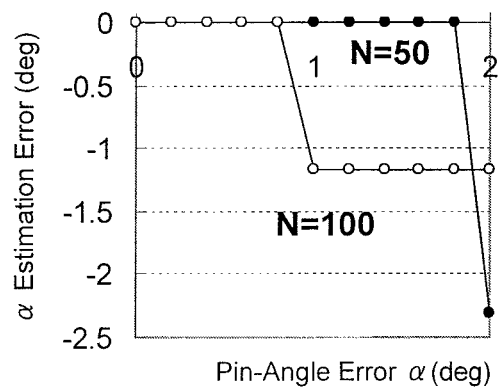
FIG. 9 is an explanatory view for an estimation accuracy of the amount of pin-angle error α in the rotational angle measurement apparatus according to the second embodiment of the invention.
Figure 10:
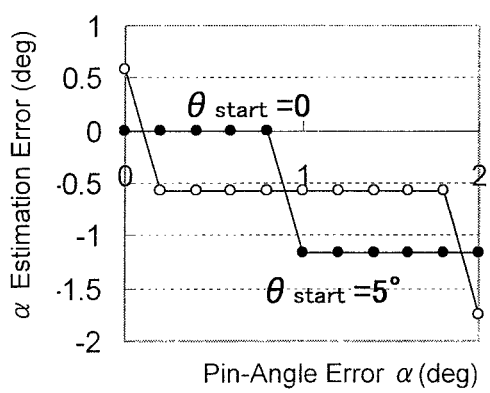
FIG. 10 is an explanatory view for an estimation accuracy of the amount of pin-angle error α in the rotational angle measurement apparatus according to the second embodiment of the invention.

Then, description is to be made to an estimation accuracy of the pin-angle error α in the rotational angle measurement apparatus according to this embodiment with reference to FIGS. 9 and 10.

FIGS. 9 and 10 are explanatory views for the estimation accuracy of the pin-angle error α in the rotational angle measurement apparatus according to the second embodiment of the invention.

In this simulation, Vx and Vy signals including the pin-angle error α are generated and the signals are processed as shown in FIG. 8 to determine an estimated value αe of the pin-angle error. The estimation error (αe−α) is determined as described above.

FIG. 9 shows the result of the simulation. FIG. 9 is a graph formed by changing the pin-angle error α in the range from 0 to 2° and then plotting the estimation errors (αe−α). The amount of estimation error is determined by using the number of sampling signals (number of sampling points) N during one rotation of the direction of the magnetic field as a parameter. When the number of sampling points is N=50, the α value is estimated correctly when α<2°. However, when the number of sampling points N is increased to 100 points, an estimation error of about 1° is generated for α≦1°.

Then, FIG. 10 shows the result of examining the estimation error when changing the starting angle θstart. The starting angle θstart shows that sampling range is set for [θstart, 2π+θstart). The sampling points are set as N=100. As a result, as shown in FIG. 10, when the starting angle θstart is 5°, the estimation error increases to 0.5° or more and the estimation error increases even in the case where the amount of error is: α<1°. In the actual correction coefficient calculation, since the origin for the direction of the magnetic field is unknown, it is necessary that the α value can be estimated accurately for any θstart value. When the starting angle θstart is 4° or less, the estimation error is small and within a range of practical use. This is to be described later with reference to FIG. 22.

As described above, according to this embodiment, an accurate rotational angle can be measured even by using a magnetic sensor including an error in the pin angle setting.

Further, since tolerance for setting the pin angle increases upon manufacturing the magnetic sensor, this facilitates manufacture.

Further, the error due to the pin-angle error can be corrected with a small amount of calculation operation.

Further, correction for the error generated by the pin-angle error of the rotational angle measurement apparatus can be attained without using an encoder for calibration.

Figure 11:
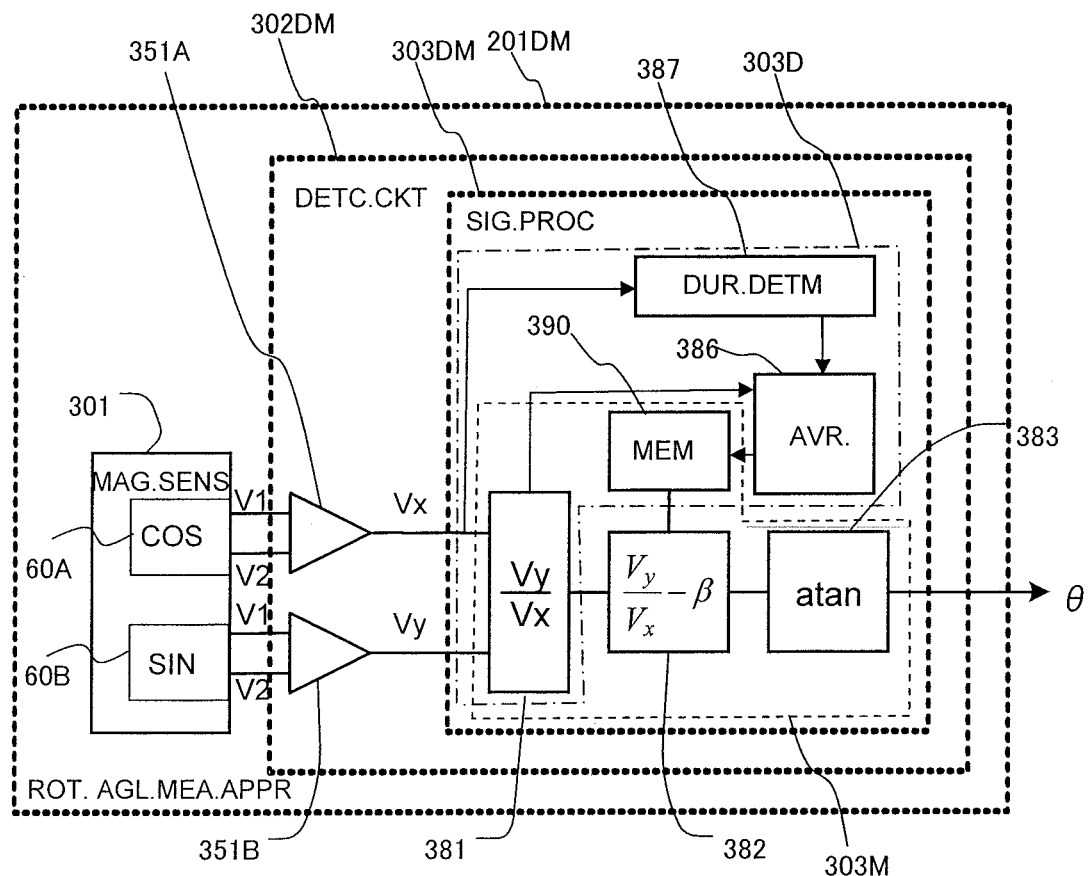
FIG. 11 is a block diagram showing a first constitution of a rotational angle measurement apparatus for examining the pin-angle error α and correcting the pin-angle error α according to a third embodiment of the invention.

Then, description is to be made to a first constitution of a rotational angle measurement apparatus for examining a pin-angle error α and correcting the pin-angle error α according to a third embodiment of the invention with reference to FIG. 11.

FIG. 11 is a block diagram showing the first constitution of the rotational angle measurement apparatus for examining the pin-angle error α and correcting the pin-angle error α according to the third embodiment of the invention. In FIG. 11, identical reference numerals to those of FIGS. 5 and 8 denote identical portions.

A rotational angle measurement apparatus 201DM of this embodiment includes a magnetic sensor 301 and a detection circuit unit 302DM. The detection circuit unit 302DM has a signal processing unit 303DM. The magnetic sensor 301 has two bridges (COS bridge and SIN bridge) each comprising GMR elements. A differential amplifier 351A detects a difference voltage between terminals V1 and V2 of the COS bridge and outputs a difference signal Vx. In the same manner, a difference amplifier 351B detects a difference voltage between terminals V1 and V2 of the SIN bridge and outputs a difference signal Vy.

The signal processing unit 303DM has a signal processing unit 303D for detecting a pin-angle error α and a signal processing unit 303M for correcting the detected pin-angle error α. The signal processing unit 303D has a constitution described with reference to FIG. 5, and the signal processing unit 303M has a constitution described with reference to FIG. 8. That is, the signal processing unit 303D has a ratio-calculation unit 381, an averaging unit 386, a duration-determination unit 387, and a parameter-storing unit 390. The operation of the signal processing unit 303D is as described in FIG. 5. The signal processing unit 303M has the ratio-calculation unit 381, a parameter correction unit 382, an a tan-processing unit 383, and a parameter storing unit 390. The operation of the signal processing unit 303M is similar to what has been described in FIG. 8.

As described above, according to this embodiment, an accurate rotational angle can be measured even by using a magnetic sensor including an error in the pin-angle setting.

Further, since the tolerance for setting the pin angle increases upon manufacturing the magnetic sensor, this facilitates manufacture.

Further, the error due to the pin-angle error can be corrected with a small amount of calculation operation.

Further, correction for the error generated by the pin-angle error of the rotational angle measurement apparatus can be attained without using an encoder for calibration.

Then, the constitution and the operation of the rotational angle measurement apparatus according to the third embodiment of the invention are to be described with reference to FIGS. 12 to 18.

As described in FIGS. 9 and 10, in the method of the first embodiment (FIG. 5), a range where the pin-angle error can be estimated at a sufficient accuracy is restricted to some extent.

Then, the present inventors have made an earnest study for the cause of degrading the estimation accuracy and have found the following points.

Figure 12:
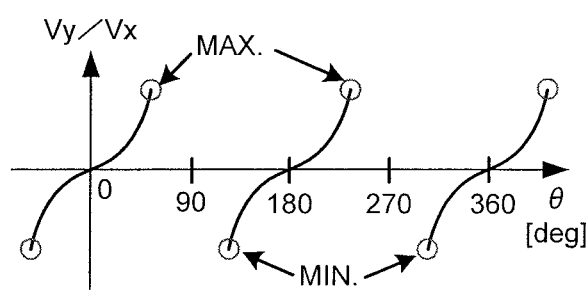
FIG. 12 is an explanatory view for the waveform of a ratio r=Vy/Vx of a signal in the rotational angle measurement apparatus according to the first embodiment of the invention.

Then, description is to be made to the waveform of the signal ratio r=Vy/Vx in the rotational angle measurement apparatus according to the first embodiment with reference to FIG. 12.

FIG. 12 is an explanatory view for the waveform of the signal ratio r=Vy/Vx in the rotational angle measurement apparatus according to the first embodiment of the invention.

In FIG. 12, there are segments, in which the signal ratio r=Vy/Vx is not calculated, owing to the conditional branching in equation (27) with respect to the absolute values |Vx| and |Vy|. The equation (27) calculates the average for the ratio r=r(θ) in the form shown in FIG. 12. As can be seen from FIG. 12, since the ratio r(θ) has a good symmetry, intermediate values cancel out between positive and negative values in the averaging process. Accordingly, the average value is substantially dominated by data at several points for maximum and minimum values of r(θ) indicated by symbol "○" in FIG. 12. Since the maximum and minimum values of r(θ) change greatly by a slight change of θ, they suffer from a significant effect depending on the processing conditions such as a number of sampling points for the signals Vx and Vy. As a result, the β value calculated by the equation (26) undergoes the effect to result an error in the pin-angle error estimated value αe.

Figure 13:
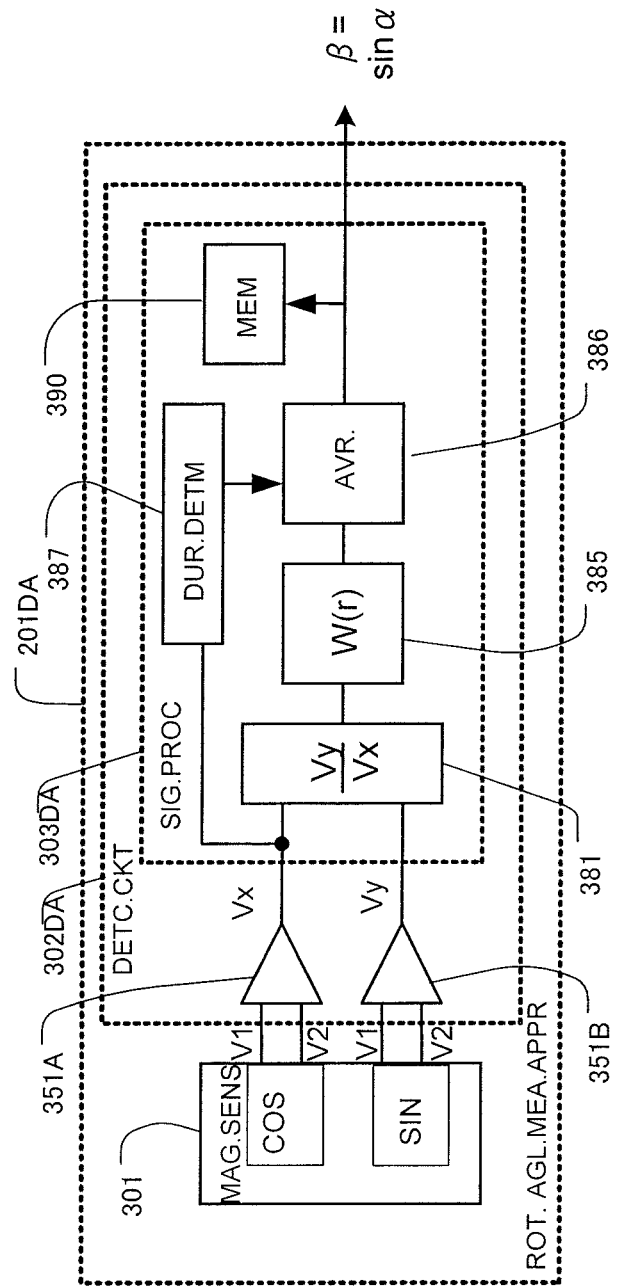
FIG. 13 is a block diagram showing a second constitution of the rotational angle measurement apparatus for examining the pin-angle error α according to the third embodiment of the invention.

Then, description is to be made to a second constitution of the rotational angle measurement apparatus for examining a pin-angle error α according to this embodiment with reference to FIG. 13.

FIG. 13 is a block diagram showing the second constitution of the rotational angle measurement apparatus for examining the pin-angle error α according to the third embodiment of the invention.

This embodiment enhances the estimation accuracy of the pin-angle error α.

A rotational angle measurement apparatus 201DA includes a magnetic sensor 301 and a detection circuit unit 302DA. The detection circuit unit 302DA has a signal processing unit 303DA. The magnetic sensor 301 has two bridges (COS bridge and SIN bridge) each comprising GMR elements. A differential amplifier 351A detects a difference voltage between terminals V1 and V2 of the COS bridge and outputs a difference signal Vx. In the same manner, a differential amplifier 351B detects a difference voltage between the terminals V1 and V2 of the SIN bridge and outputs a difference signal Vy. In the present specification, the difference signals Vx and Vy are referred to as output signals of the respective bridges. The output signals Vx and Vy of the bridges are input signals Vx and Vy inputted to the signal processing unit.

A ratio-calculation unit 381 receives the input signals Vx, Vy inputted to the signal processing unit and determines the ratio Vy/Vx. Specifically, the signals Vx, Vy are inputted to an AD converter of a microcontroller, and a ratio-calculation unit 381 may be disposed in the microcontroller. Upon calculation of the ratio Vy/Vx, the calculation error can be decreased by conditional branching process based on magnitude comparison between absolute values |Vx| and |Vy|.

Then, a window function processing unit 385 receives the ratio r=Vy/Vx and applies an appropriate window function to be described later with respect to FIG. 14. An averaging unit 386 receives the signals subjected to the window function processing and conducts averaging processing. The averaging processing is conducted for the duration in which the direction of the magnetic field turns for one rotation. Duration is determined by using a duration-determination unit 387 for detecting the duration for one rotation. Specifically, the duration-determination unit 387 determines the duration till which the Vx signal voltage twice passes a value equal to the starting voltage. Since the Vx signal is in proportion to cos θ, twice passage through the identical value corresponds to 1 cycle. As shown in the equation (27), the average value is equal to the sin β of the pin-angle error α (=sin α).

The duration for averaging process may be the duration in which the direction of the magnetic field rotates for several times. Since the first term in the equation (25) is reduced to zero when the averaging duration is a multiple integer of 360°, that is, [0, 2Nrπ), the obtained average value is equal to the sin for the pin-angle error α (β=sin α). Here, Nr is an integer of 1 or greater which is the number of cycles for the rotation of the direction of the magnetic field. Further, since the number of sampling points of data to be averaged is increased by rotation for a plurality of times, it also provides an effect of improving the calculation accuracy for the β value.

The β value obtained as described above is stored in a parameter-storing unit 390.

Next, a window function W(r) used in the window function processing unit 385 in the rotational angle measurement apparatus according to this embodiment is described with reference to FIGS. 14 and 15.

Figure 14:
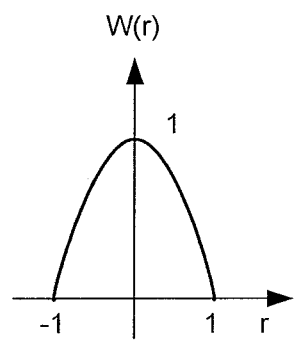
FIG. 14 is an explanatory view for a window function used in a window function processing unit of the rotational angle measurement apparatus according to the third embodiment of the invention.
Figure 15:
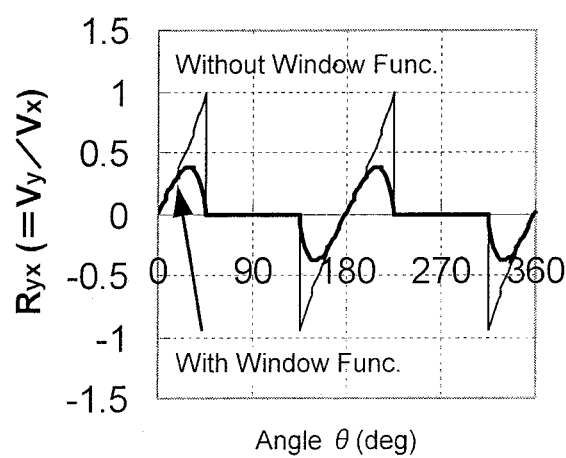
FIG. 15 is an explanatory view for the window function used in the window function processing unit of the rotational angle measurement apparatus according to the third embodiment of the invention.

FIGS. 14 and 15 are explanatory views for the window function used in the window function processing unit of the rotational angle measurement apparatus according to the third embodiment of the invention.

As a specific example of the window function W(r) used in the window function processing unit 385, the following equation (31) is used.

[Equation 31]

$$W(r) = 1 - r^2 \tag{31}$$

FIG. 14 shows a function form of the window function W(r) represented by the equation (31). The requirements for the window function applied to the window function processing unit 385 of the processing circuit 303DA in FIG. 13 are the following two conditions:

(a) It is an even function symmetrical with respect to r=0.
(b) It has a function form in which the value is smaller toward the both ends of the input range.

As shown in FIG. 14, the window function W(r) of the equation (31) satisfies the conditions (a) and (b).

FIG. 15 is a graph formed by plotting "r×W(r)" prepared by multiplying the ratio r by the window function W(r) of the equation (26) relative to the angle of magnetic field θ. It can be seen that discontinuous points present in the ratio r are eliminated by multiplying the window function to form a smooth waveform with respect to θ. Accordingly, even when conditions such as the number of sampling points or sampling start angle are changed, for instance, the average value of r×W(r) changes scarcely. That is, since a stable and robust estimation method is obtained by applying the window function, it is more preferable.

The process of a signal processing circuit, in FIG. 13, which is made robust by applying the window function, can be described using the following equation (32).

[Equation 32]

$$\text{if } (|V_x| > |V_y|) \text{ then } r = \frac{V_y}{V_x} \tag{32}$$

$$r_2 = r^*(1 - r^2)$$

$$\text{average } (r_2, [0, 2\pi))^* A = \sin\alpha \equiv \beta$$

The coefficient A is a conversion coefficient formed by introducing the window function. Conversion coefficient A is A=5.5 when the window function of the equation (31) is used. When the form of the window function is changed, the coefficient A also changes.

Figure 16:
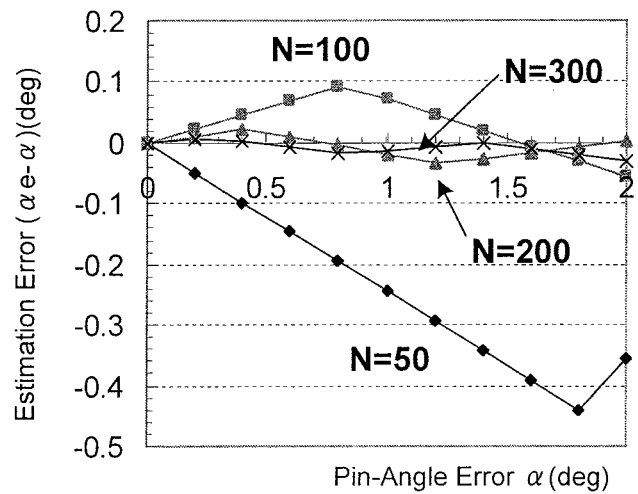
FIG. 16 is an explanatory view for the estimation accuracy of the amount of pin-angle error α in the rotational angle measurement apparatus according to the third embodiment of the invention.
Figure 17:
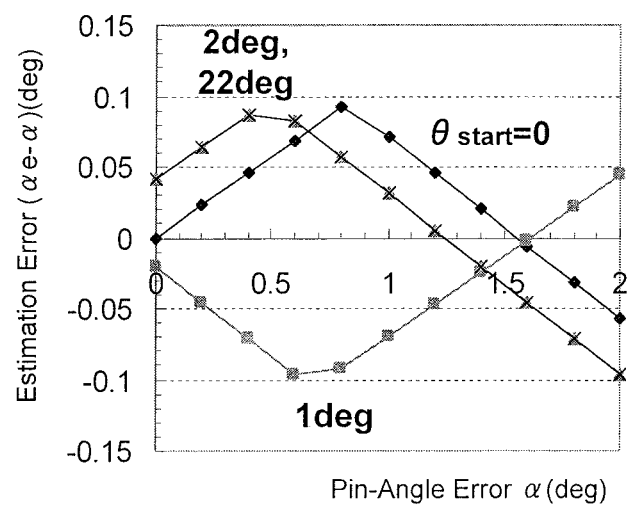
FIG. 17 is an explanatory view for the estimation accuracy of the amount of pin-angle error α in the rotational angle measurement apparatus according to the third embodiment of the invention.
Figure 18:
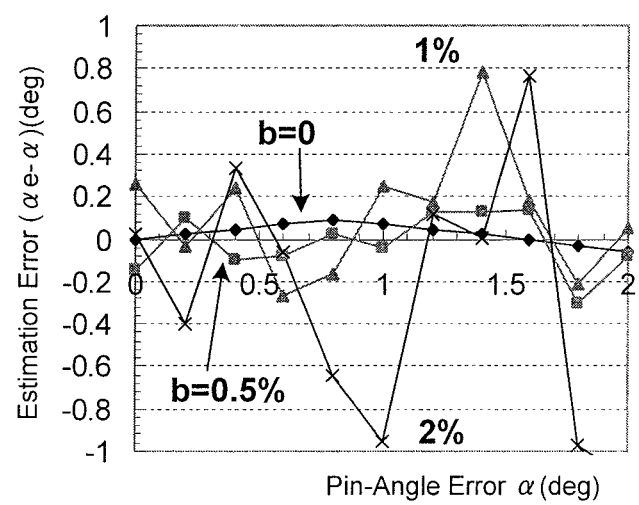
FIG. 18 is an explanatory view for the estimation accuracy of the amount of pin-angle error α in the rotational angle measurement apparatus according to the third embodiment of the invention.

Then, description is to be made to estimation accuracy for the amount of the pin-angle error α in the rotational angle measurement apparatus according to this embodiment with reference to FIGS. 16 to 18.

FIGS. 16 to 18 are explanatory views for the estimation accuracy of the amount of pin-angle error α in the rotational angle measurement apparatus according to the third embodiment of the invention.

The estimation error when the pin-angle error α is estimated by the constitution shown in FIG. 15 or by the equation (32) is to be described. The method of determining the estimation error (αe−α) is as described above.

FIG. 16 shows a result of examining the estimation error (αe−α) of the pin-angle error α by changing the number of sampling points N. When the number of sampling points N is 50 points, the estimation error also increases as the pin-angle error α increases. On the other hand, when N=100 points, the estimation error is within ±0.1°, and a sufficient accuracy is obtained. The accuracy is further enhanced at N=200 points and the error is reduced to 0.03° or less. Further, it can be seen that the estimation accuracy of ±0.2° can be obtained by setting the sampling points as: N≧100.

FIG. 17 shows a result of examining the dependence on a starting angle θstart. The pin-angle error is estimated while changing sampling range to [θstart, 360°±θstart). The estimation error falls within a range of ±0.1° even when the range is changed as θstart=0 to 2, 22° and it can be seen that the error can be estimated stably by the introduction of the window function W(r).

FIG. 18 shows the result of examining the effect of noises. The effect of superimposing noises on the signals Vx and Vy signals is examined. Noise components at amplitude ratio b(%) with respect to the cos or sin component are superimposed on the signal voltages Vx and Vy and the estimated value αe of the pin-angle error α is determined based on the signals (Vx, Vy) including the noises. FIG. 18 shows the estimation error. The estimation error is ±0.1° or less at the amplitude ratio b=0.5% of the noise, and it is ±0.25° or less at the amplitude ratio b=1% of the noise. As the noise amplitude increases as: b=2%, the estimation error increases to ±1%. It can be seen from FIG. 18 that the pin-angle error can be estimated at a sufficient accuracy when the noise is 0.5% or less.

An accurate estimation value αe can be given stably and robustly even when various signal obtaining conditions are changed according to the constitution of FIG. 13, that is, a constitution of determining the sine of the pin-angle error α (β=sin α) by averaging a value obtained by multiplying the ratio variable r=Vy/Vx by a window function W(r).

In the parameter estimation processing method shown by the equation (32), the angle of magnetic field θ may be for one rotation but it may be for plural rotations. That is, it may be Nr rotations (Nr>1). By Nr rotation, since the number of sampling points substantially increases and the accuracy of the parameter estimation is improved, it is further preferable.

As described above, according to this embodiment, correction for the error generated due to pin-angle error in the rotational angle measurement apparatus can be attained without using an encoder for calibration.

Further, calculation for the pin-angle error can be corrected with a small amount of calculation operation.

Figure 19:
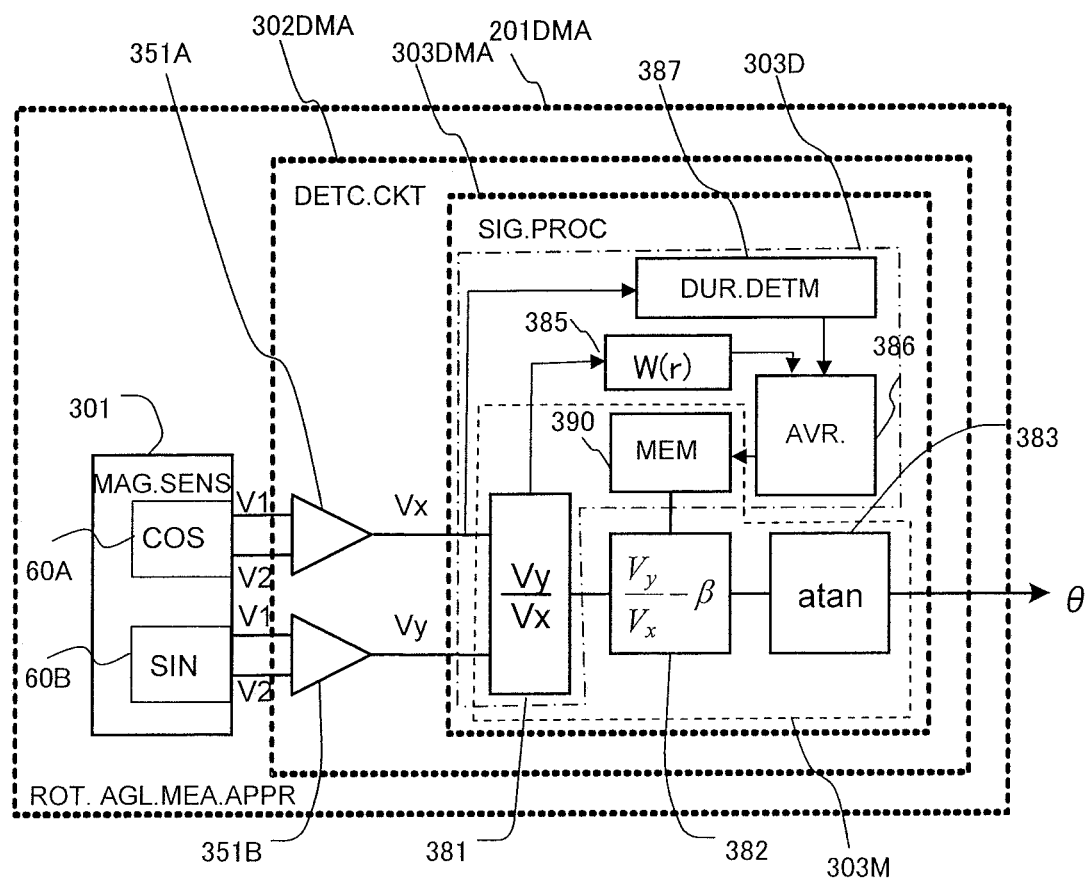
FIG. 19 is a block diagram showing a second constitution of a rotational angle measurement apparatus for examining a pin-angle error α and correcting the pin-angle error α according to a fourth embodiment of the invention.

Then, description is to be made to the second constitution of a rotational angle measurement apparatus for examining a pin-angle error α and correcting the pin-angle error α according to a fourth embodiment of the invention with reference to FIG. 19.

FIG. 19 is a block diagram showing a second constitution of the rotational angle measurement apparatus for examining a pin-angle error α and correcting the pin-angle error α according to the fourth embodiment of the invention. In FIG. 19, identical reference numerals to those in FIGS. 8 and 13 denote identical portions.

A rotational angle measurement apparatus 201DMA of this embodiment includes a magnetic sensor 301 and a detection circuit unit 302DMA. The detection circuit unit 302DMA has a signal processing unit 303DMA. The magnetic sensor 301 has two bridges (COS bridge and SIN bridge) each comprising GMR elements. A differential amplifier 351A detects a difference voltage between terminals V1 and V2 of the COS bridge and outputs a difference signal Vx. In the same manner, a differential amplifier 351B detects a difference voltage between the terminals V1 and V2 of the SIN bridge and outputs a difference signal Vy.

The signal processing unit 303DMA includes a signal processing unit 303D for detecting a pin-angle error α and a signal processing unit 303M for correcting the detected pin-angle error α. The signal processing unit 303D has a constitution explained with reference to FIG. 13, and the signal processing unit 303M has a constitution explained with reference to FIG. 8. That is, the signal processing unit 303D includes a ratio-calculation unit 381, a window function processing unit 385, an averaging unit 386, a duration-determination unit 387, and a parameter-storing unit 390. The operation of the signal processing unit 303D is as described with reference to FIG. 13. The signal processing unit 303M includes the ratio-calculation unit 381, a parameter correction unit 382, an a tan-processing unit 383, and the parameter-storing unit 390. The operation of the signal processing unit 303M is as described with reference to FIG. 8.

As described above, according to this embodiment, accurate rotational angle can be measured by using the magnetic sensor including an error in a pin-angle setting.

Further, since the tolerance in the pin angle setting is increased upon manufacturing the magnetic sensor, this facilitates manufacture.

Further, error due to the pin-angle error can be corrected with a small amount of calculation operation.

Further, correction for the error generated due to the pin-angle error of the rotational angle measurement apparatus can be attained without using an encoder for calibration.

Figure 20:
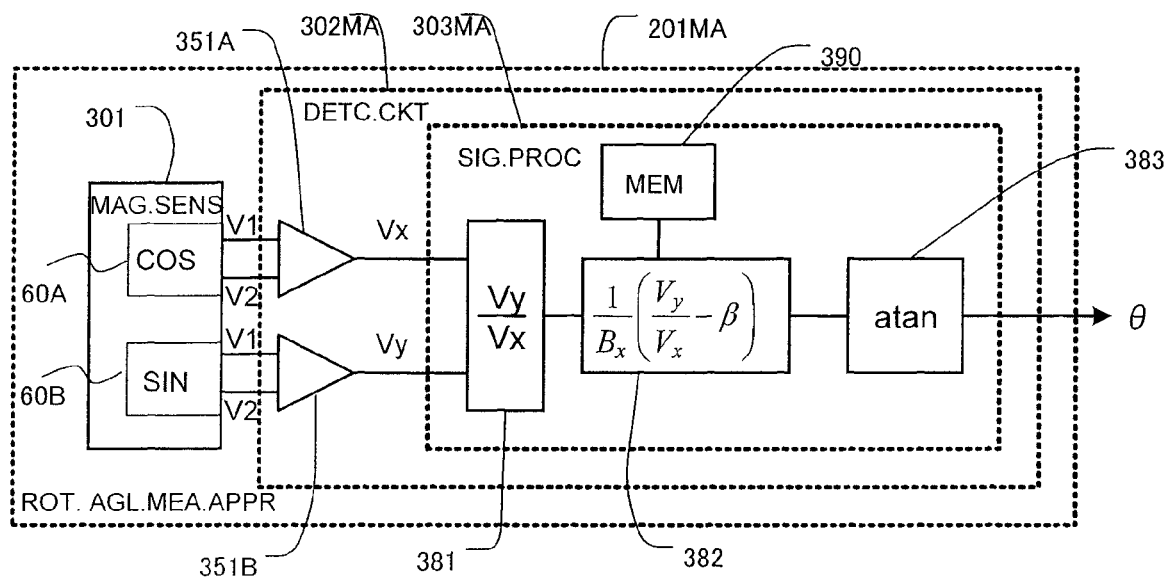
FIG. 20 is a block diagram showing a second constitution of a rotational angle measurement apparatus for correcting a pin-angle error α according to a fifth embodiment of the invention.
Figure 21A:
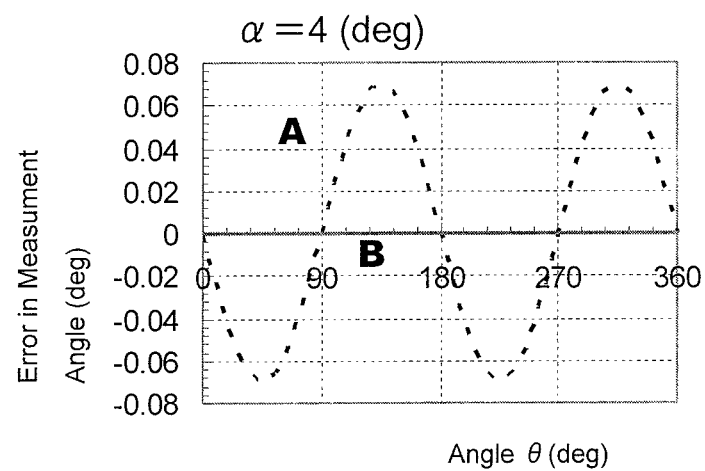
FIGS. 21A and 21B are explanatory view for the estimation accuracy of the amount of pin-angle error α in the rotational angle measurement apparatus according to the fifth embodiment of the invention.
Figure 21B:
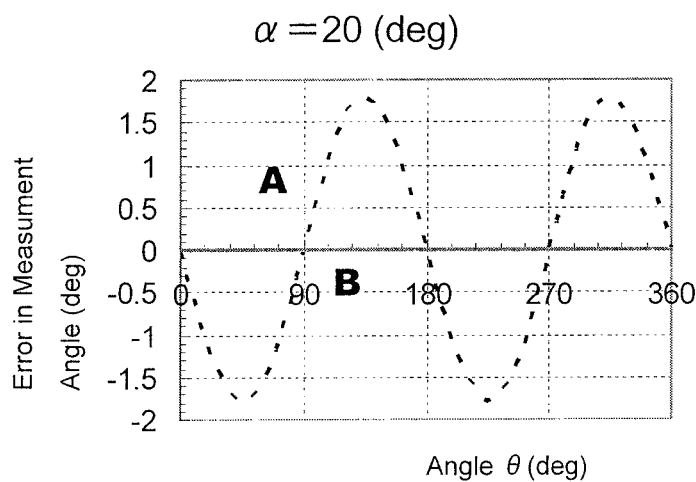
Figure 22:
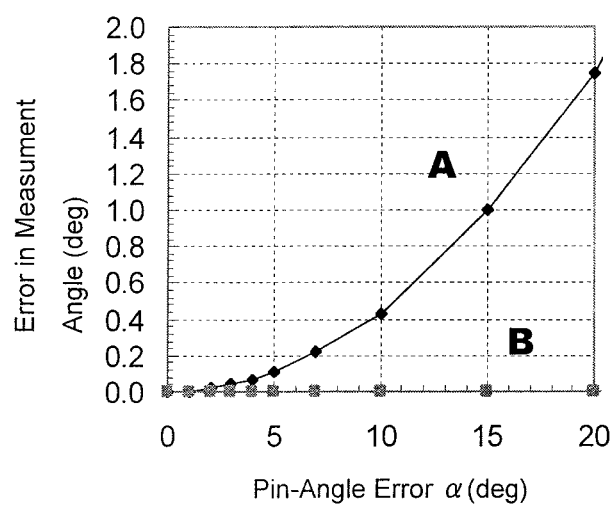
FIG. 22 is an explanatory view for the estimation accuracy of the amount of pin-angle error α in the rotational angle measurement apparatus according to the fifth embodiment of the invention.

Then, description is to be made to a constitution and an operation of a rotational angle measurement apparatus according to a fifth embodiment of the invention with reference to FIGS. 20 to 22.

First, description is to be made to a second constitution of the rotational angle measurement apparatus for correcting a pin-angle error α according to this embodiment with reference to FIG. 20.

FIG. 20 is a block diagram showing the second constitution of a rotational angle measurement apparatus for correcting the pin-angle error α according to the fifth embodiment of the invention.

FIG. 20 shows a circuit constitution for executing the correction processing during operation as a rotational angle sensor which corrects the rotational angle measurement value by using the sine of the error α (β=sin α) determined by the constitution shown in FIG. 13. The constitution can correct the pin-angle error at the good accuracy even when it is large.

Correction according to the equation (28) is effective in the case where the pin-angle error |α|≦4°. This embodiment can conduct correction effectively even when the pin-angle error |α|>4°.

A rotational angle measurement apparatus 201MA includes a magnetic sensor 301 and a detection circuit unit 302MA. The detection circuit unit 302MA has a signal processing unit 303MA. The magnetic sensor 301 has two bridges (COS bridge and SIN bridge) each comprising GMR elements. A differential amplifier 351A detects a difference voltage between terminals V1 and V2 of the COS bridge and outputs a difference signal Vx. In the same manner, a differential amplifier 351B detects a difference voltage between terminals V1 and V2 of the SIN bridge and outputs a difference signal Vy. In the present specification, the difference signals Vx and Vy are referred to as output signals of the respective bridges. The output signals Vx and Vy of the bridges are input signals Vx and Vy inputted to the signal processing unit.

A ratio-calculation unit 381 receives the input signals Vx and Vy inputted to the signal processing unit and determines the ratio Vy/Vx. Specifically, the signals Vx and Vy are inputted to an AD converter of a microcontroller and the ratio-calculation unit 381 may be disposed in the microcontroller. Then, a parameter correction unit 382 subtracts β from the ratio r and then divides the difference by a coefficient Bx. The parameters β and Bx are read out from a parameter-storing unit 390.

Then, an a tan-processing unit 383 conducts arctangent processing to calculate an angle of magnetic field θ.

Description is to be made specifically. From the equation (25), the following equation (33) is obtained.

[Equation 33]

$$\theta = \mathrm{ArcTan}\left(\frac{1}{B_x}\left(\frac{V_y}{V_x} - \beta\right)\right) \quad (33)$$

in which $B_x = \mathrm{SQRT}(1-\beta^2)$.

Then, according to the equation (33), a value in the 4-quadrant for 0 to 360° is outputted appropriately in consideration of positive and negative sign for Vx and Vy. That is, θ can be expressed by the following equation (34).

[Equation 34]

$$\theta = a\tan 2(V_y - \beta V_x, B_x V_x) \quad (34)$$

The parameter correction unit 382 calculates the content in the bracket in the equation (33). The a tan-processing unit 383 conducts processing for outputting the value in the 4-quadrant for 0 to 360° as represented by the equation (34).

As apparent from FIG. 20, assuming the angle outputted from the rotational angle measurement apparatus 201M according to this embodiment as θ, the following relation is established between tan θ and the output signals Vx and Vy of the magnetic sensor 301.

[Equation 35]

$$\frac{1}{\sqrt{1-x^2}} \frac{V_y}{V_x} - \tan\theta_2 = x \qquad (35)$$

in which x=β is a constant non-zero value (that is, not zero) not depending on the rotational angle θ.

Since β=0 corresponds to a case in which the correction processing is not conducted, when the processing of this embodiment is conducted, the β value is a constant non-zero value.

While the relation described in the equation (33) and the equation (34) is correct, the ratio Vy/Vx diverges as Vx approaches zero. Accordingly, the calculation error increases when calculation is conducted with a finite digital number. Further, when the circuit operation is tested, the effect of the measurement error is expanded. Then, in the case of |Vx|<|Vy|, the equation (33) is transformed by using the ratio r2=Vx/Vy as described below.

[Equation 36]

$$(1-xr_2)\cot\theta = r_2\sqrt{1-x^2} \qquad (36)$$

in which r2=(Vx/Vy).

That is, to test the operation of the circuit in FIG. 20, the equation (33) may be used in the case of |Vx|≧|Vy| and the equation (36) may be used in the case of |Vx|<|Vy|. Therefore, the operation can be tested with a minimum effect of the calculation error or measurement error. Since the relation using the a tan 2 function of the equation (34) contains conditional branch processing depending on the magnitude relation between |Vx| and |Vy| in the internal algorithm of the a tan 2 function, it is valid in any of the cases.

Then, description is to be made to estimation accuracy for the amount of the pin-angle error α in the rotational angle measurement apparatus according to this embodiment with reference to FIGS. 21 and 22.

FIGS. 21 and 22 are explanatory views for the estimation accuracy for the amount of the pin-angle error α in the rotational angle measurement apparatus according to the fifth embodiment of the invention.

FIG. 21A is a graph formed by plotting errors of the rotational angle θ after correction for the case of correction by the correction circuit in FIG. 8 (A in the drawing) and a case of correction by the correction circuit in FIG. 20 (B in the drawing) at the pin-angle error α of 4°.

FIG. 21B is a graph formed by plotting errors of the rotational angle θ after correction for the case of correction by the correction circuit in FIG. 8 (A in the drawing) and a case of correction by the correction circuit in FIG. 20 (B in the drawing) at the pin-angle error α of 20°.

FIG. 21A shows a case in which the pin-angle error α=4° and the error is a maximum of 0.07° by using the correction circuit of FIG. 8, that is, only by the correction for the βvalue and a sufficient accuracy can be obtained. On the other hand, FIG. 21B is a case at α=20° in which the error is a maximum of 1.7° by the correction circuit in FIG. 8 and the error is increased. However, when the correction circuit in FIG. 20 is used, the error is zero as shown in the curve B in FIG. 21B and a sufficient accuracy can be obtained.

FIG. 22 shows a relation between various pin-angle errors and the maximum error for the output angle θ by each of the correction methods. In the drawing, the curve A shows the result using the correction circuit in FIG. 8, and the curve B is a case of using the correction circuit in FIG. 20. As can be seen from the drawing, the error falls within 0.1° or less at α≦4° and a sufficient accuracy can be obtained by the correction circuit in FIG. 8. On the other hand, in the case of α>4°, it can be seen that a sufficient accuracy can be ensured by using the correction method of FIG. 20 (curve B).

As described above, according to this embodiment, an accurate rotational angle can be measured by decreasing the estimation error for the pin angle even a magnetic sensor including an error in the pin angle setting is used.

Further, since the tolerance for setting the pin angle increases upon manufacturing the magnetic sensor, this facilitates manufacture.

Further, the error due to the pin-angle error can be corrected with a small amount of calculation operation.

Further, correction for the error generated due to the pin-angle error of the rotational angle measurement apparatus can be attained without using an encoder for calibration.

Figure 23:
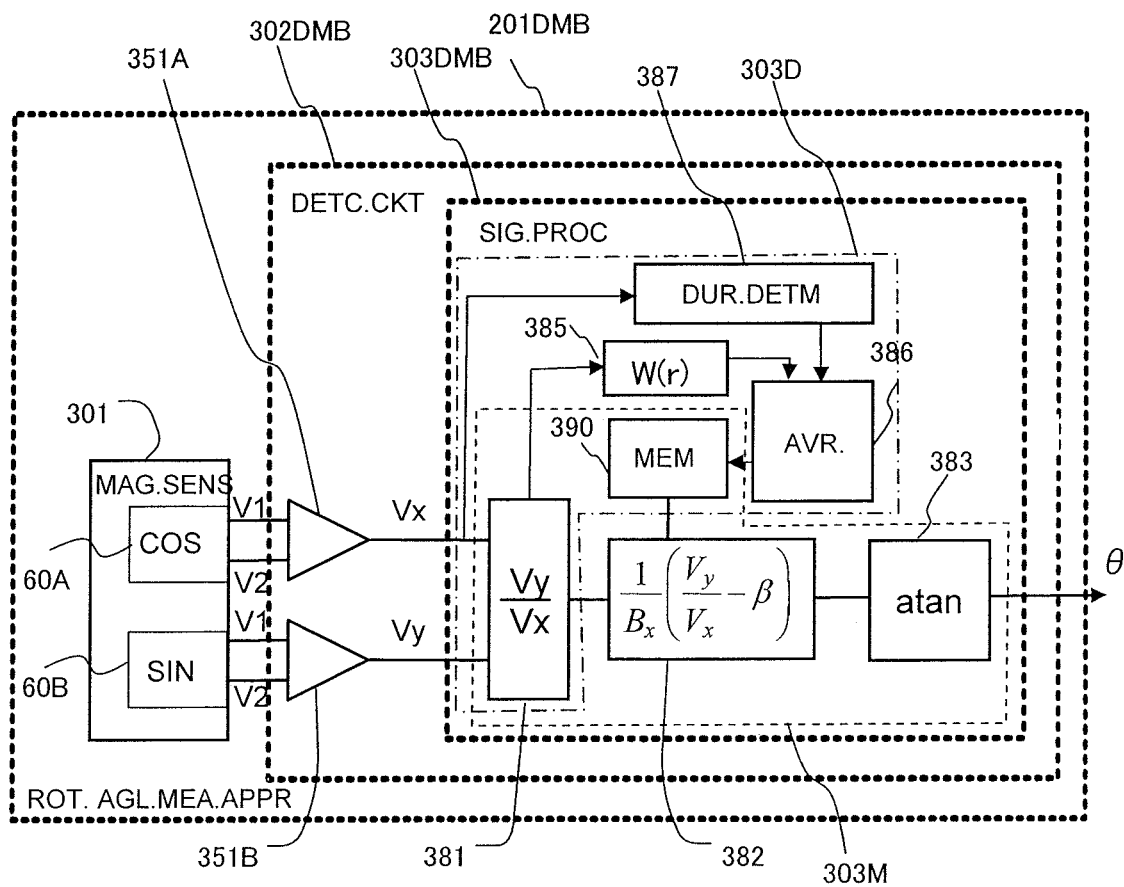
FIG. 23 is a block diagram showing a third constitution of a rotational angle measurement apparatus for examining a pin-angle error α and correcting the pin-angle error α according to a sixth embodiment of the invention.

Then, description is to be made to a third constitution of a rotational angle measurement apparatus for examining a pin-angle error α and correcting the pin-angle error α according to a sixth embodiment of the invention with reference to FIG. 23.

FIG. 23 is a block diagram showing the third constitution of the rotational angle measurement apparatus for examining the pin-angle error α and correcting the pin-angle error α according to the sixth embodiment of the invention. In FIG. 23, identical reference numerals to those of FIGS. 13 and 20 denote identical portions.

A rotational angle measurement apparatus 201DMB of this embodiment includes a magnetic sensor 301 and a detection circuit unit 302DMB. The detection circuit unit 302DMB has a signal processing unit 303DMB. The magnetic sensor 301 has two bridges (COS bridge and SIN bridge) each comprising GMR elements. A differential amplifier 351A detects a difference voltage between terminals V1 and V2 of the COS bridge and outputs a difference signal Vx. In the same manner, a difference amplifier 351B detects a difference voltage between terminals V1 and V2 of the SIN bridge and outputs a difference signal Vy. In the present specification, the difference signals Vx and Vy are referred to as output signals of respective bridges. The output signals Vx and Vy of the bridges are input signals Vx and Vy inputted to the signal processing unit.

The signal processing unit 303DMB has a signal processing unit 303D for detecting a pin-angle error α and a signal processing unit 303M for correcting the detected pin-angle error α. The signal processing unit 303D has a constitution described with reference to FIG. 13, and the signal processing unit 303M has a constitution described with reference to FIG. 20. That is, the signal processing unit 303D has a ratio-calculation unit 381, a window function processing unit 385, an averaging unit 386, a duration-determination unit 387, and a parameter-storing unit 390. The operation of the signal processing unit 303D is as described in FIG. 13. The signal processing unit 303M has the ratio-calculation unit 381, a parameter correction unit 382, an a tan-processing unit 383, and the parameter storing unit 390. The operation of the signal processing unit 303M is as described in FIG. 20.

As described above, according to this embodiment, an accurate rotational angle can be measured even by using a magnetic sensor including an error in the pin-angle setting.

Further, since the tolerance for setting the pin angle increases upon manufacturing the magnetic sensor, this facilitates manufacture.

Further, the error due to the pin-angle error can be corrected with a small amount of calculation operation.

Further, correction for the error generated due to the pin-angle error of the rotational angle measurement apparatus can be attained without using an encoder for calibration.

Then, the constitution of a rotational angle measurement apparatus according to a seventh embodiment of the invention is to be described with reference to FIG. 24.

Figure 24:
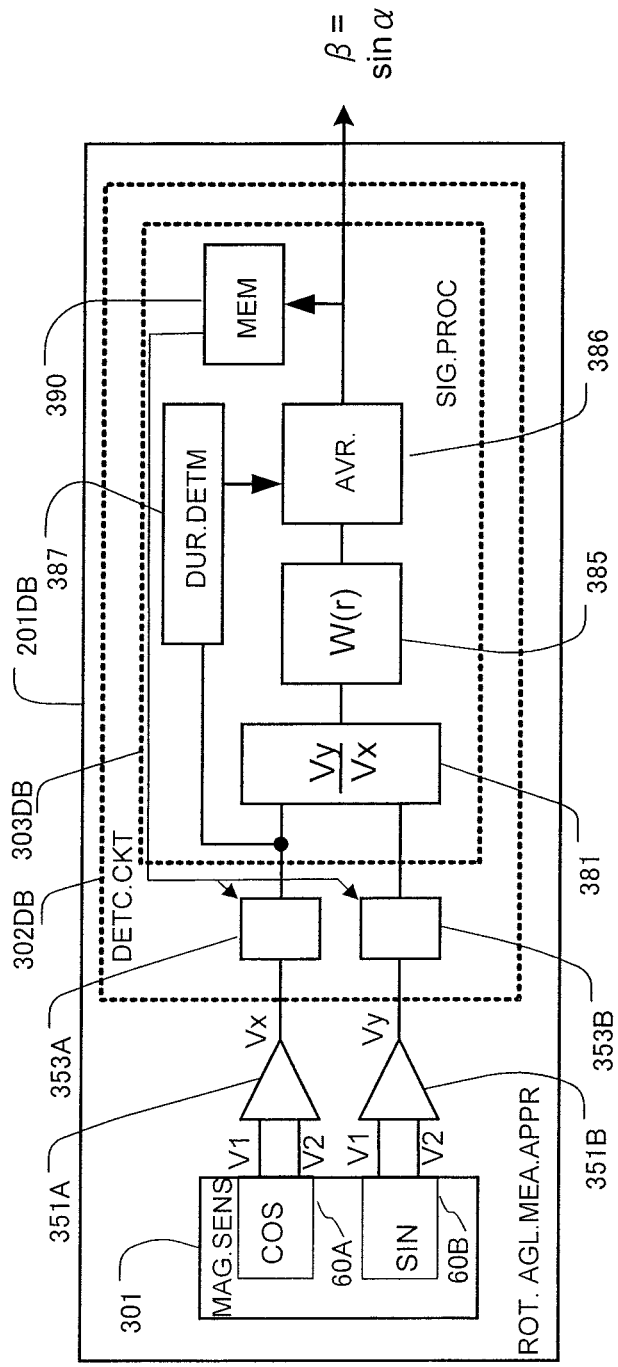
FIG. 24 is a block diagram showing the constitution of a rotational angle measurement apparatus according to a seventh embodiment of the invention.

FIG. 24 is a block diagram showing the constitution of the rotational angle measurement apparatus according to the seventh embodiment of the invention.

The error of the measurement accuracy in the rotational angle measurement apparatus using the GMR sensor is attributed to an error due to a pin-angle error; in some cases, the error of the measurement accuracy is also attributed to a signal offset. This embodiment enables measurement at high accuracy by also removing such a cause of error.

The signal offset is generated due to variations in the angle-independent term Rn0 of GMR elements. The signal offset that may be included in the output signals Vx and Vy of the GMR sensor is to be described.

When the resistance of a GMR element is separated into a magnetic field-independent term Rn0 and a magnetic field dependent term ΔR and represented as:

[Equation 37]

$$R_n = R_{n0} \pm \Delta R \quad (37)$$

The output signal ΔV of the GMR bridge is represented by the following equation (38):

[Equation 38]

$$\Delta V = \frac{e_0(R_{10}R_{30} - R_{20}R_{40})}{(R_1 + R_4)(R_2 + R_3)} + C\Delta R \quad (38)$$

in which C is:

[Equation 39]

$$C = \frac{e_0(R_{10} + R_{30} + R_{20} + R_{40})}{(R_1 + R_4)(R_2 + R_3)} \quad (39)$$

In the equation (38), when the magnetic field-independent resistance components are equal to each other, no offset is generated in signal ΔV since R10×R30=R20×R40 is established. On the other hand, when R10×R30≠R20R40 due to the variations in resistance values, an offset component, which is independent of the direction of the magnetic field, is generated.

Since the equations (22) and (23) are not valid when the offset is present, the correction algorithm of the equation (27) or the equation (32) is not valid. Accordingly, prior to the application of the correction algorithm, it is necessary to remove the signal offset.

As can be seen from the equation (37), in the case where the offset is present, the equations (22) and (23) are represented by the following equations (40) and (41).

[Equation 40]

$$V_x = -\Delta V_c = C\frac{G}{2}\cos\theta + V_{Cofs} \quad (40)$$

[Equation 41]

$$V_y = \Delta V_s = C\frac{G}{2}\sin(\theta + \alpha) + V_{Sofs} \quad (41)$$

Since negative and positive components of the cos function and the sin function are offset from each other by 1 cycle integration, the offset voltages VCofs and VSofs are determined by rotating the direction of the magnetic field by 0 to 360° and averaging the same. That is, the offset voltages VCofs and VSofs can be calculated by following equations;

[Equation 42]

$$\text{average}(V_x, [0, 2\pi]) = V_{Cofs} \equiv b_x \quad (42)$$

[Equation 43]

$$\text{average}(V_y, [0, 2\pi]) = V_{Sofs} \equiv b_y \quad (43)$$

Accordingly, both of the offset voltage attributable to the scattering of the resistance and the pin-angle error can be corrected by the following correction procedures.

(a) The magnetic field turns for 2 rotation at a constant angular velocity and (b) the respective offset voltages bx, by of Vx and Vy are determined at the first rotation according to the equations (42) and (43).

(c) At the second rotation, the value Vx'=Vx−bx and Vy'=Vy−by obtained by subtracting bx and by from Vx and Vy respectively are calculated to determine the amount of pin-angle error β relative to Vx' and Vy' according to the algorithm of the equation (27) or the equation (32).

(d) Bx is calculated from the β value according to Bx=SQRT(1−β²).

Description has been made to an example of turning the direction of the magnetic field for one rotation in the detection step for the offset voltages bx and by and turning the direction of the magnetic field for one rotation in the detection step for the amount of pin-angle error (correction parameter) β. Alternatively, it is also possible to turn the direction of the magnetic field for (n+m) or more rotation, and turn the direction of the magnetic field for n rotations (n>1) in the detection step for offset voltages bx and by, and then, turn the direction of the magnetic field for m rotations (m>1) in the detection step for the amount of pin-angle error (correction parameter) β.

Since the direction of the magnetic field may be rotated between the offset voltage detection step and the detection step for the correction parameter β, the rotational direction of the direction of the magnetic field is (n+m) times in total. When the direction of the magnetic field is turned by plural rotations in each of the detection step for the offset voltage and the detection step for the correction parameter β, this provides an advantage of enhancing the obtaining accuracy for each of the parameters since the number of sampling points is increased.

The circuit shown in FIG. 24 shows a circuit constitution which is used for examining the pin-angle error a in the case where the magnetic sensor includes a signal offset and a pin-angle error.

A rotational angle measurement apparatus 201DB of this embodiment includes a magnetic sensor 301 and a detection circuit unit 302DB. The detection circuit unit 302DB has a signal processing unit 303DB. As described in FIGS. 6A and 6B, the magnetic sensor 301 has two bridges (COS bridge and SIN bridge) each comprising GMR elements. A differential amplifier 351A detects a difference voltage between terminals V1 and V2 of the COS bridge and outputs a difference signal Vx. In this embodiment, it is set as Vx=−ΔVc=−(V2−V1). Further, a differential amplifier 351B detects a difference voltage between terminals V1 and V2 of the SIN bridge and outputs a difference signal Vy. In this case, Vy=ΔVs. In the present specification, the difference signals Vx and Vy are referred to as output signals of the respective bridges. The output signals Vx and Vy of the bridges are input signals Vx and Vy inputted to the signal processing unit.

A ratio-calculation unit 381 receives the input signals Vx and Vy inputted to the signal processing unit and determines the ratio Vy/Vx. Specifically, the signals Vx and Vy are inputted to an AD converter of a microcontroller, and the ratio-calculation unit 381 may be disposed in the microcontroller. Upon calculation of the ratio Vy/Vx, the calculation error can be decreased by branching due to comparison between absolute values as shown in the equation (27).

Then, a window function processing unit 385 receives the ratio r=Vy/Vx and applies an appropriate window function described in FIG. 14.

An averaging unit 386 receives the signal subjected to the window function processing and conducts averaging processing. The averaging unit 386 averages the output signals Vx and Vy at the first rotation of the magnetic field rotation to determine respective offsets bx and by in accordance with the equation (42) and the equation (43), and stores them in a parameter-storing unit 390. At the second rotation of the magnetic field rotation, the output signals Vx and Vy are subtracted by using the offset voltages bx and by stored in the storing unit 390 in the offset-subtraction units 353A and 353B respectively.

Signals Vx'=Vx−bx and Vy'=Vy−by corrected for the offset are the input signals inputted to the signal processing unit 303DB. The input signals Vx' and Vy' inputted to the signal processing unit 303DB is processed as described above by the ratio-calculation unit 381, the window function processing unit 385, and the averaging unit 386 so that the sine of the pin-angle error α (β=sin α) is obtained.

The thus obtained β value is stored in the parameter-storing unit 390.

Description has been made to an example of turning the direction of the magnetic field for one rotation in the detection step for the offset voltages bx and by and turning the direction of the magnetic field for one rotation in the detection step for the amount of pin-angle error (correction parameter) β. Alternatively, it is also possible to turn the direction of the magnetic field for (n+m) rotations or more, turn the direction of the magnetic field for n rotations (n>1) in the detection step for the offset voltages bx, by and, thereafter, turn the direction of the magnetic field for m rotations (m>1) in the detection step for the amount of pin-angle error (correction parameter) β. Since the direction of the magnetic field may be rotated between the detection step for the offset voltage and the detection step for the correction parameter β, the rotational direction for the direction of the magnetic field is (n+m) times in total. Since the number of sampling points increases when the direction of the magnetic field turns for a plurality of times in each of the detection steps for the offset voltage and the detection step for the correction parameter, this provides an advantage of improving the obtaining accuracy for each parameter β.

As described above, in this embodiment, the error attributable to the variations of elements of the GMR sensor can be corrected only by the subtraction of three parameters β, bx and by, and multiplication of coefficient 1/Bx. Since the calculation processing gives less calculation load, they can be executed easily by an inexpensive general-purpose microcontroller.

As described above, according to this embodiment, error generated due to the pin-angle error in the rotational angle measurement apparatus can be corrected without using an encoder for calibration.

Further, the error due to the pin-angle error can be corrected with a small amount of calculation operation.

Then, the constitution and the operation of a rotational angle measurement apparatus according to an eighth embodiment of the invention are to be described with reference to FIG. 25.

Figure 25:
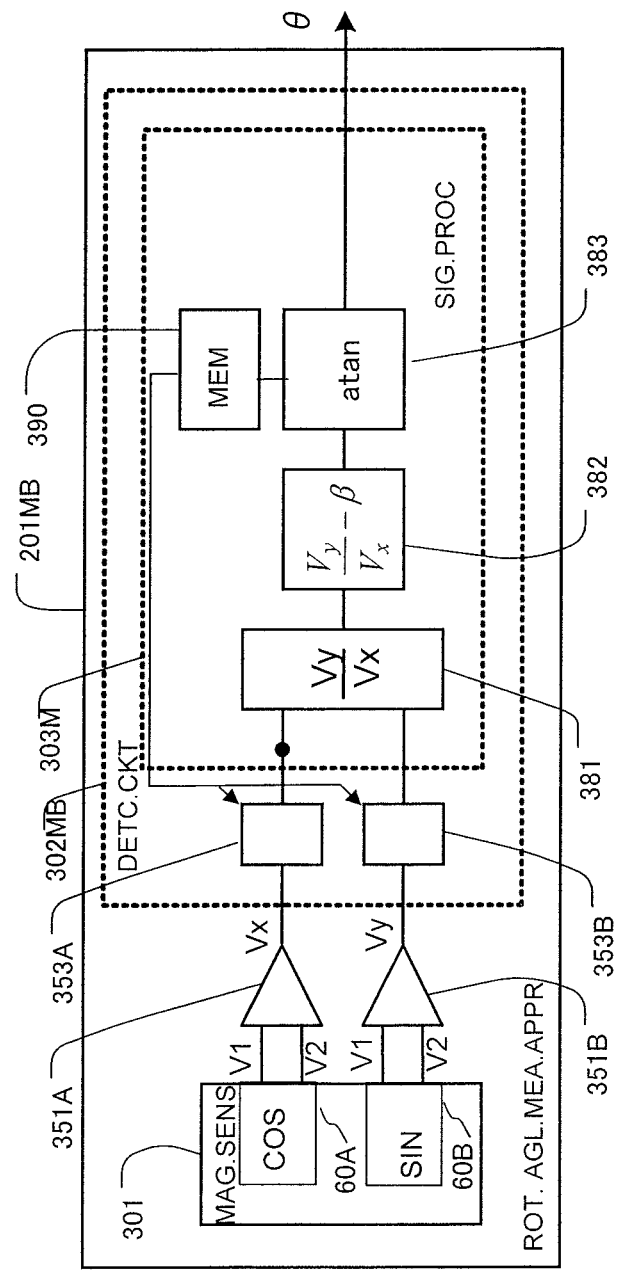
FIG. 25 is a block diagram showing a third constitution of a rotational angle measurement apparatus for correcting a pin-angle error α according to an eighth embodiment of the invention.

FIG. 25 is a block diagram showing the third constitution of the rotational angle measurement apparatus for correcting the pin-angle error α according to the eighth embodiment of the invention.

FIG. 25 shows a circuit constitution for executing correction processing during operation as the rotational angle sensor, which corrects a measured rotational angle value by using offset voltages bx and by and the sine of an error α (β=sin α) determined by the constitution of FIG. 24.

A rotational angle measurement apparatus 201MB of this embodiment includes a magnetic sensor 301 and a detection circuit unit 302MB. The detection circuit unit 302MB has offset-subtraction units 353A and 353B, and a signal processing unit 303M. The magnetic sensor 301 has two bridges (COS bridge and SIN bridge) each comprising GMR elements. A differential amplifier 351A detects a difference voltage between terminals V1 and V2 of the COS bridge and outputs a difference signal Vx. In the same manner, a difference amplifier 351B detects a difference voltage between terminals V1 and V2 of the SIN bridge and outputs a difference signal Vy.

The offset-subtraction units 353A and 353B subtract offset voltages bx and by stored in a storing unit 390 from the output signals Vx and Vy respectively. Vx'=Vx−bx and Vy'=Vy−by corrected for the offset are input signals inputted to the signal processing unit 303M.

The input signals Vx' and Vy' are inputted to the signal processing unit 303M. A ratio-calculation unit 381 included in the signal processing unit 303M receives the input signals Vx' and Vy' to determine a ratio Vy'/Vx'. Specifically, the signals Vx' and Vy' may be inputted to an A/D converter of a microcontroller and the ratio-calculation unit 381 may be disposed in the microcontroller. Then, a parameter correction unit 382 reads out a correction parameter β stored in the parameter storing unit 390 and conducts correction processing. Specifically, the parameter β is subtracted from the ratio Vy'/Vx'. Then, an a tan-processing unit 383 conducts arctangent processing to calculate an angle of magnetic field θ. The a tan-processing unit 383 conducts processing of the equation (29).

As described above, according to this embodiment, an accurate rotational angle can be measured by correcting the offset error and decreasing the estimation error for the pin angle even when a magnetic sensor including an error in the pin-angle setting is used.

Further, since the tolerance for setting the pin angle increases upon manufacturing the magnetic sensor, this facilitates manufacture.

Further, the error due to the pin-angle error can be corrected with a small amount of calculation operation.

Further, correction for the error generated due to the pin-angle error of the rotational angle measurement apparatus can be attained without using an encoder for calibration.

In each of the embodiments described above, while a method of signal processing based on the ratio Vy/Vx has been explained, the signal processing may also be conducted based on Vx/Vy. The equation (28) and the equation (33) are processed in the actual processing by the equation (29) and the equation (34) respectively. In the processing for a tan 2 (y, x) in the equation (29) and the equation (34), the angle is calculated as ArcTan(y/x), as well as an angle is obtained also by processing as ArcCot(x/y). In the case of |x|>|y|, calculation accuracy is higher for ArcTan (y/x) and in the case of |x|<|y|, calculation accuracy is higher for ArcCot (x/y).

Then, the constitution of a motor system using the rotational angle measurement apparatus according to each of the embodiments described above is to be explained with reference to FIGS. 26 and 27.

Figure 26:
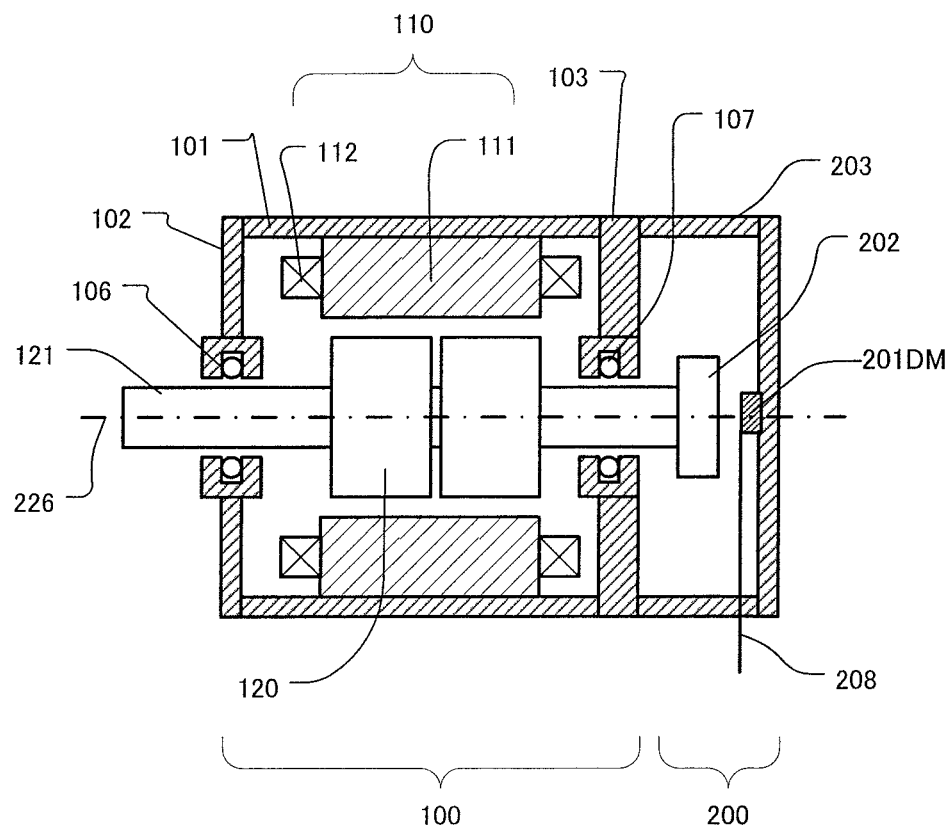
FIG. 26 is a constitutional view of a motor system using the rotational angle measurement apparatus according to each of the embodiments of the invention.
Figure 27:
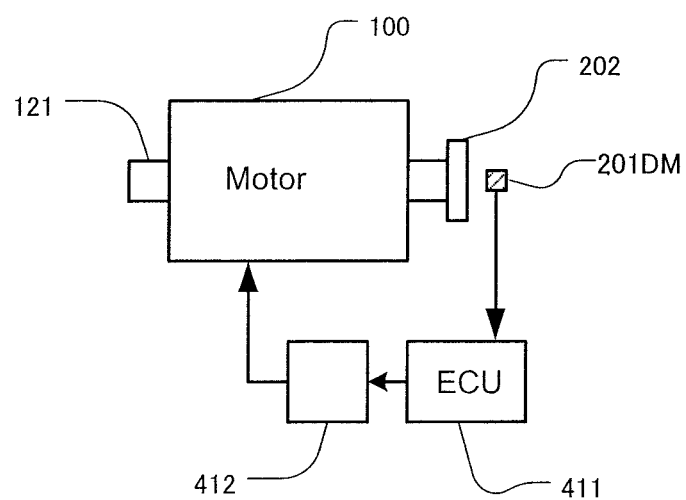
FIG. 27 is a constitutional view of a motor system using the rotational angle measurement apparatus according to each of the embodiments of the invention.

FIGS. 26 and 27 show constitutional views of the motor system using the rotational angle measurement apparatus according to each of the embodiments of the invention.

The motor system in this embodiment includes a motor unit 100 and a rotational angle-measurement unit 200.

The motor unit 100 generates a rotational torque by rotation of a plurality of rotatable magnetic poles under the magnetic interaction between a plurality of fixed magnetic poles and a plurality of rotatable magnetic poles. The motor unit 100 includes a stator 110 providing a plurality of fixed magnetic poles and a rotor 120 providing a plurality of rotatable magnetic poles. The stator 110 includes a stator core 111 and a stator coil 112 attached to the stator core 111. The rotor 120 is disposed opposite to the inner circumferential side of the stator 110 by way of a gap and supported rotatably. In this embodiment, a three-phase AC surface permanent magnet synchronous motor is used as the motor 100.

A case includes a cylindrical frame 101, and a first bracket 102 and a second bracket 103 disposed on both axial ends of the frame 101. A bearing 106 is disposed in a hollow portion of the first bracket 102 and a bearing 107 is disposed in a hollow portion of the second bracket 103 respectively. The bearings 106 and 107 rotatably support a rotation shaft 121.

A sealant (not illustrated) is disposed between the frame 101 and the first bracket 102. The sealant is an O-ring disposed in a ring-like form and sandwiched and compressed in the axial direction and the radial direction by the frame 101 and the first bracket 102. A portion between the frame 101 and the first bracket 102 can be sealed to provide water proof on the front side. Further, also a portion between the frame 101 and the second bracket 103 is made water proof by a sealant (not illustrated).

The stator 110 includes the stator core 111 and the stator coil 112 attached to the stator core 111 and disposed to the inner circumferential surface of the frame 101. The stator core 111 is a magnetic material formed by stacking a plurality of silicon steel sheets in the axial direction (magnetic path formation body). The stator core 111 includes an annular-back core and a plurality of teeth arranged at regular intervals in the circumferential direction while protruding inside the radial direction from the inner circumference of the back-core.

Winding conductors constituting the stator coil 112 are wound concentrically around each of the plurality of teeth. The plurality of winding conductors are electrically connected on every phase by connection members arranged in parallel on one axial end on one coil end of the stator coil 112 (on the side of the second bracket 103) and further connected electrically as three phase windings. The connection system for three phase windings includes a Δ(delta) connection system and a Y(star) connection system. This embodiment adopts the Δ(delta) connection system.

The rotor 120 includes a rotor core fixed on the outer circumferential surface of the rotation shaft 121, a plurality of magnets fixed on the outer circumferential surface of the rotor core, and magnet covers 122a, 122b disposed on the outer circumferential side of the magnets. The magnet cover 122 is used for preventing the magnets from scattering from the rotor core, and this has a cylindrical structure or a tube-like structure formed of a non-magnetic material such as stainless steel (generally referred to as SUS).

Then, the constitution of the rotational angle-measurement unit 200 is to be described.

The rotational angle-measurement unit 200 includes a rotational angle measurement apparatus 201DM (hereinafter referred to as "magnetic sensor module 201DM") and a sensor magnet 202. The rotational angle-measurement unit 200 is disposed in a space surrounded by a housing 203 and the second bracket 103. The sensor magnet 202 is disposed to a shaft that rotates interlocking with the rotation shaft 121. As the rotation shaft 121 changes the rotational position, the direction of the magnetic field generated in accordance with the change is changed. Therefore, the rotational angle (rotational position) of the rotation shaft 121 can be measured by detecting the direction of the magnetic field by the magnetic sensor module 201DM.

The magnetic sensor module 201DM is preferably disposed on the center line of rotation 226 of the rotation shaft 121 since the error in the spatial distribution of the magnetic field generated from the sensor magnet 202 is decreased.

The sensor magnet 202 is a 2-pole magnet magnetized in 2-pole form, or a multi-pole magnet magnetized in multiple pole form.

The magnetic sensor module 201DM includes, as shown in FIG. 8, a magnetic sensor 301 and a detection circuit unit 302M. The detection circuit unit 302M has a signal processing unit 303M.

The magnetic sensor 301 changes its output signal in accordance with the direction of the magnetic field and comprises GMR elements.

The magnetic sensor module 201DM detects the direction of the magnetic field $\theta m$ at a place where the magnetic sensor is disposed with reference to a reference angle $\theta m0$ of the magnetic sensor. That is, the magnetic sensor module 201DM outputs a signal corresponding to $\theta=\theta m-\theta m0$. The magnetic sensor 301 used in this embodiment includes two bridges comprising GMR elements; and the two bridges output signals in proportion to $\cos(\theta m-\theta m0)$ and $\sin(\theta m-\theta m0\pm\alpha)$ respectively. Here, $\alpha$ represents a pin-angle error.

The magnetic sensor module 201DM is disposed in the housing 203. The housing 203 is preferably formed of a material having a relative permeability of 1.1 or less such as aluminum or resin so as not to give an effect on the direction of magnetic flux. In this embodiment, the housing is formed of aluminum.

It may suffice that the magnetic sensor module 201DM is fixed to the motor unit, and it may be fixed to a constituent element other than the housing 203. So long as the sensor module is fixed to the motor unit, the rotational angle of the rotation shaft 121 can be detected by detecting the change of the direction of the magnetic field by the magnetic sensor 301 in the case where the rotational angle of the rotation shaft 121 is changed and the direction of the sensor magnet 202 is changed.

A sensor wiring 208 is connected to the magnetic sensor module 201DM. The sensor wiring 208 transmits the output signal from the magnetic sensor 301 to the outside.

The magnetic sensor module 201DM includes, as shown in FIG. 11, a magnetic sensor 301 and a detection circuit unit 302DM. The magnetic sensor 301 includes a plurality of GMR elements arranged in a bridge structure. The magnetic sensor 301 has the structure shown in FIGS. 6A and 6B. The detection circuit unit 302DM includes a driving circuit unit for supplying a voltage applied to the GMR elements, a differential amplifier 351 for detecting and amplifying signals from the GMR elements and a signal processing unit 303DM for processing the signals outputted from the differential amplifier 351. The signal processing unit 303DM has a constitution shown in FIG. 11.

Then, the constitution of a motor system when a correction parameter obtained is to be described with reference to FIG. 27. Signals from the magnetic sensor module 201DM are inputted to an electronic control unit 411 (simply referred to as ECU). The ECU 411 sends a control command to a driving unit 412. The driving unit 412 controls the angular velocity and the position of the rotation shaft and the like of the rotor 120 by outputting an appropriate voltage waveform to the stator 110 of the motor unit 100.

When the correction parameter is obtained, the rotor 120 is rotated at a constant velocity by sending a command for rotating the rotor 120 at a constant angular velocity from the ECU 411 to the driving unit 412. In this process, the signal processing unit 303DM of the magnetic sensor module 201DM obtains the correction parameter and stores the same in a parameter-storing unit 390 by the constitution shown in FIG. 13.

Alternatively, the magnetic sensor module 201DM may be composed only of the magnetic sensor 301 and the detection circuit unit 302DM may be formed inside the ECU 411.

In this embodiment, the correction parameter can be updated on every certain time interval. In this constitution, even when the correction parameter shows aging change by the use of the rotational angle measurement apparatus for a long time, an accurate measuring result can be maintained by using the updated correction parameter.

The magnetic sensor module 201DM may have a constitution of the rotational angle measurement apparatus 201DMA shown in FIG. 19 or the rotational angle measurement apparatus 201DMB shown in FIG. 23. Further, when the correction parameter is previously obtained by using an apparatus to be described later with reference to FIG. 29, the magnetic sensor module 201DM may have a constitution of the rotational angle measurement apparatus 201M shown in FIG. 8, the rotational angle measurement apparatus 201MA shown in FIG. 20, and the rotational angle measurement apparatus 201MB shown in FIG. 25. In this case, a previously obtained correction parameter is stored in the storing unit 390.

Then, description is to be made to the constitution of an electrically power-assisted steering system using the rotational angle measurement apparatus according to each of the embodiments described above with reference to FIG. 28.

Figure 28:
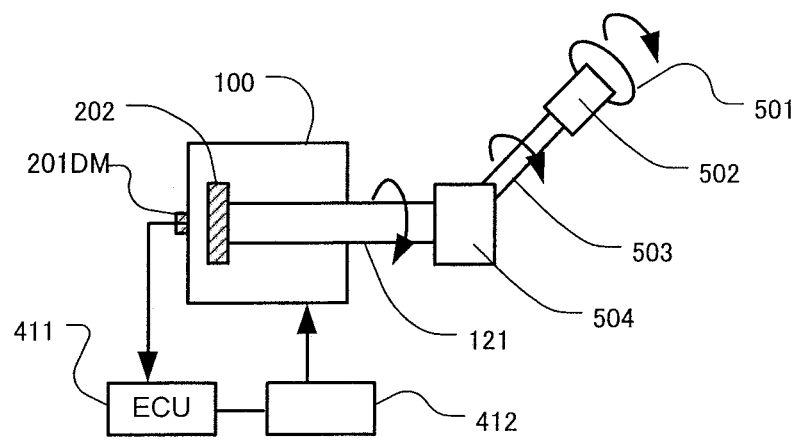
FIG. 28 is a constitutional view of an electric power steering system using a rotational angle measurement apparatus according to each of the embodiments of the invention.

FIG. 28 is a constitutional view of the electrically power-assisted steering system using the rotational angle measurement apparatus according to each of the embodiments of the invention.

In the electrically power-assisted steering system shown in FIG. 28, a steering shaft 503 coupled mechanically to a steering wheel 501 moves interlocking with the rotational shaft 121 by way of a joint unit 504 including gears, etc. The rotation shaft 121 is a rotation shaft of the motor 100 in which a sensor magnet 202 is disposed to one end of the rotation shaft 121. A rotational angle measurement apparatus 201DM (hereinafter referred to as "magnetic sensor module 201DM") is disposed in the vicinity of the sensor magnet 202 and measures the rotational angle of the rotation shaft 121 and transmits the same to the ECU 411. The ECU 411 calculates an appropriate amount of motor driving based on the signal from the torque sensor (not illustrated) disposed in a steering column 502 and the rotational angle signal from the magnetic sensor module 201DM; then, the ECU 411 transmits the signal obtained by the calculation to the motor drive unit 412. The motor 100 assists the movement of the steering shaft 503 by way of the rotation shaft 121.

For a calibration of the system, the system is set to the system origin, i.e., the origin of an angle as the system of the electrically power-assisted steering apparatus; and the rotational angle $\theta r0$ of the rotation shaft 121 is read out in this state. Specifically, when the steering wheel 501 is set to an appropriate position, a signal from the magnetic sensor module 201DM is measured to determine the angle of magnetic field $\theta m$ in this state, and the rotational angle $\theta m0$ of the angle of magnetic field corresponding to the system origin is stored and held in the controlling apparatus (electronic control unit ECU) 411 of the electrically power-assisted steering apparatus.

Even when a mounting-position error is present upon installing the rotational angle measurement apparatus to the system, the error can be corrected so long as the angle of magnetic field $\theta m0$ corresponding to the system origin is known.

Information necessary in the system such as the electrically power-assisted steering apparatus is an angle $\theta sys$ as the system, that is, a rotational angle of the steering wheel. According to this embodiment, the angle $\theta sys$ as the system can be obtained accurately from the angle of magnetic field $\theta m$ obtained from the output signal of the magnetic sensor module 201DM.

The magnetic sensor module 201DM may have the constitution of the rotational angle measurement apparatus 201DMA shown in FIG. 19 or the rotational angle measurement apparatus 201DMB shown in FIG. 23. Further, when the correction parameter is previously obtained by using the apparatus to be described later with reference to FIG. 29, the magnetic sensor module 201DM may have the constitution of the rotational angle measurement apparatus 201M shown in FIG. 8, the rotational angle measurement apparatus 201MA shown in FIG. 20, or the rotational angle measurement apparatus 201MB shown in FIG. 25. In this case, a previously obtained correction parameter is stored in the storing unit 390.

Then, description is to be made to an inspection system upon manufacturing the magnetic sensor 301 by using the rotational angle measurement apparatus according to each of the embodiments described above with reference to FIG. 29.

Figure 29:
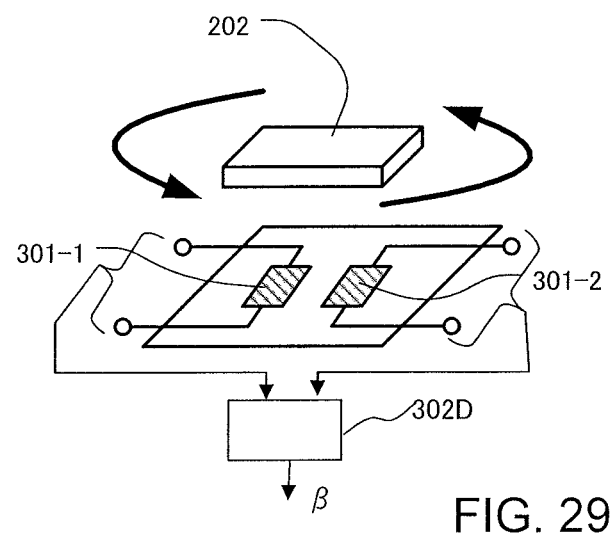
FIG. 29 is an explanatory view of an inspection system upon manufacturing a magnetic sensor using the rotational angle measurement apparatus according to each of the embodiments of the invention.

FIG. 29 is an explanatory view of the inspection system upon manufacturing the magnetic sensor by using the rotational angle measurement apparatus according to each of the embodiments of the invention.

In this embodiment, the correction parameter is obtained in the inspection step upon manufacturing the magnetic sensor 301. As shown in FIG. 29, the magnetic sensor 301 including GMR elements is disposed on a stage and, while rotating a magnetic field generator 202 that generates a uniform magnetic field, (Vx, Vy) signals of each of the magnetic sensors are measured. In this process, the correction parameter is obtained on every sensor according to the methods of the equations (32), (42), and (43) by using the rotational angle measurement apparatus 201D shown in FIG. 5, the rotational angle measurement apparatus 201DA shown in FIG. 13, or the rotational angle measurement apparatus 201DB shown in FIG. 24. Thus, the pin-angle error value α (or β=sin α), signal offset voltages bx and by, and the Bx value defined by the equations (42) and (43) can be determined for every respective magnetic sensor 301.

As described above, the magnetic sensor 301 obtaining the correction parameter is incorporated into the rotational angle measurement apparatus 201MA. The signal processing unit 303MA of the rotational angle measurement apparatus 201MA has the constitution shown in FIG. 20 and records the correction parameters β and Bx in the parameter storing unit 390. In this way, since the rotational angle measurement apparatus 201MA can decrease the effect of the pin angle setting error, measurement at high accuracy is possible.

Figure 1:
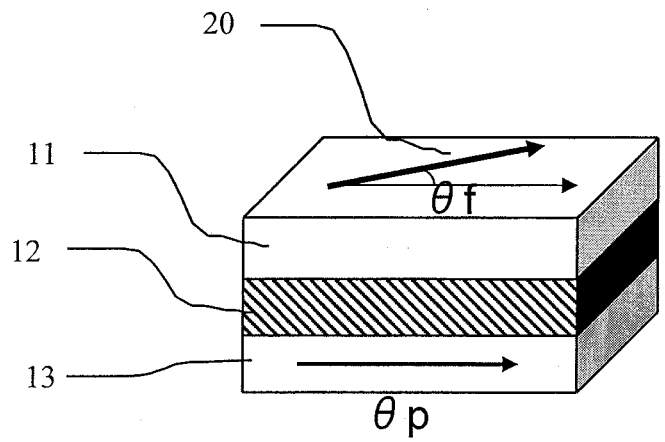
FIG. 1 is a schematic view showing the constitution of a giant magneto-resistance element.
Figures 2A, 2B:
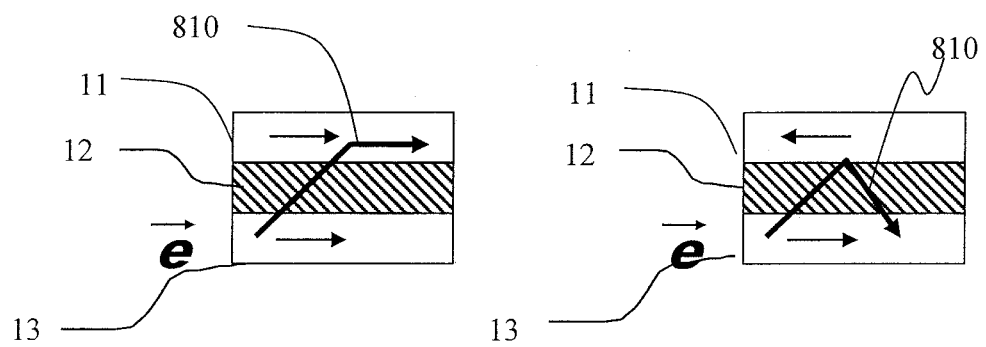
FIGS. 2A and 2B are schematic views showing the behavior of electrons in the giant magneto-resistance element.
Figures 3A, 3B:
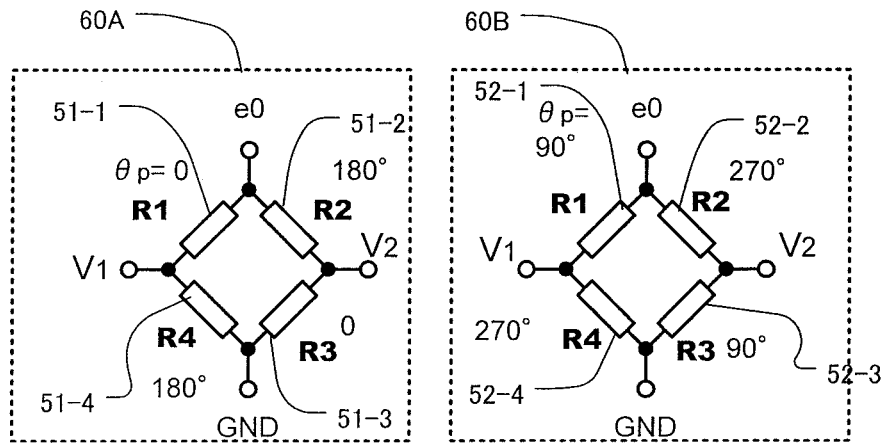
FIGS. 3A and 3B are schematic views showing a sensor bridge in a magnetic sensor used in a rotational angle measurement apparatus using the giant magneto-resistance elements.
Figure 4:
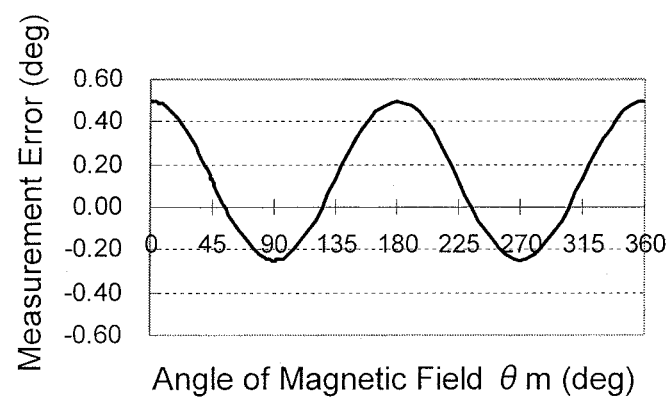
FIG. 4 is a view showing an error contained in a measurement angle in the case where the pin angle includes an error.

In the foregoing description, while GMR elements are used as the magnetic sensor, this invention is effective also to the rotational angle measurement apparatus using TMR elements (Tunneling Magneto-Resistance elements) as the magnetic sensor. The TMR element uses an insulator layer as the spacer 12 in FIG. 2 in which the resistance value changes in accordance with the angle formed between the magnetization direction of the pinned magnetic layer (pin angle) θp and the magnetization direction θf the free magnetic layer (the magnetization direction of the free magnetic layer is aligned with the direction of the external magnetic field). Accordingly, the same effect can be obtained by applying the invention.

What is claimed is:

1. A rotational angle measurement apparatus comprising:
a magnetic sensor that includes first and second bridges each comprising magneto-resistance elements each having a pinned magnetic layer; and
a signal processing unit that receives an output signal Vx from the first bridge as an input signal Vx and an output signal Vy from the second bridge as an input signal Vy and outputs an angle of magnetic field θ,
wherein the difference between a ratio Vy/Vx of the input signals and tan θ is a constant non-zero value.

2. The rotational angle measurement apparatus according to claim 1,
wherein the signal processing unit includes;
a ratio-calculation unit that calculates the ratio Vy/Vx of the input signals Vx and Vy,
a parameter correction unit that subtracts a predetermined correction parameter β from the ratio Vy/Vx calculated by the ratio-calculation unit, and
an a tan-processing unit that conducts an arctangent processing on the value calculated by the parameter correction unit and calculates the angle of magnetic field θ.

3. The rotational angle measurement apparatus according to claim 2,
wherein the parameter correction unit divides the calculated value (Vy/Vx−β) by Bx=SQRT(1−β²).

4. The rotational angle measurement apparatus according to claim 2, further comprising
an offset-subtraction unit that subtracts predetermined offsets bx and by from the output signal Vx of the first bridge and the output signal Vy of the second bridge respectively,
wherein the output signals (Vx−bx) and (Vy−by) from the offset-subtraction unit are each inputted to the signal processing unit.

5. The rotational angle measurement apparatus according to claim 1,
wherein the signal processing unit includes an averaging unit that calculates a correction parameter β from an average value of the ratio Vy/Vx of the input signals for the duration in which the direction of the magnetic field turns for one rotation or a plurality of rotations.

6. The rotational angle measurement apparatus according to claim 5,
wherein the signal processing unit includes a window function processing unit that multiplies the ratio Vy/Vx calculated by the ratio-calculation unit by a window function W(r) having the ratio r (=Vy/Vx) as an argument,
and the averaging unit calculates an average value of the output from the window function processing unit for the duration in which the direction of the magnetic field turns for one rotation or a plurality of rotations.

7. The rotational angle measurement apparatus according to claim 6,
wherein the window function W(r) is an even function.

8. The rotational angle measurement apparatus according to claim 6,
wherein the parameter correction unit divides the calculated value by Bx=SQRT(1−β²).

9. The rotational angle measurement apparatus according to claim 1,
wherein the magneto-resistance element is a giant magneto-resistance element.

10. A rotational angle measurement apparatus comprising:
a magnetic sensor that includes first and second bridges each comprising magneto-resistance elements each having a pinned magnetic layer; and
a signal processing unit that receives an output signal Vx from the first bridge as an input signal Vx and an output signal Vy from the second bridge as an input signal Vy and outputs an angle of magnetic field θ,
wherein a constant non-zero value x satisfying (1/SQRT (1−x²))×(Vy/Vx)−tan θ=x is present between a ratio Vy/Vx of the input signals and tan θ, and x is a constant value not depending on θ.

11. The rotational angle measurement apparatus according to claim 10,
wherein the signal processing unit includes;
a ratio-calculation unit that calculates a ratio Vy/Vx of the input signals Vx and Vy,
a parameter correction unit that subtracts a predetermined correction parameter β from the ratio Vy/Vx calculated by the ratio-calculation unit, and
an a tan-processing unit that conducts arctangent processing on the value calculated by the parameter correction unit and calculates the angle of magnetic field θ.

12. The rotational angle measurement apparatus according to claim 11,
wherein the parameter correction unit divides a calculated value (Vy/Vx−β) by Bx=SQRT (1−β²).

13. The rotational angle measurement apparatus according to claim 11, further comprising
an offset-subtraction unit that subtracts predetermined offset voltages bx and by from the output signal Vx of the first bridge and the output signal Vy of the second bridge respectively,
wherein the output signals (Vx−bx) and (Vy−by) from the offset-subtraction unit are each inputted to the signal processing unit.

14. The rotational angle measurement apparatus according to claim 10,
wherein the signal processing unit includes an averaging unit that calculates a correction parameter β from an average value of the ratio Vy/Vx of the input signals for the duration in which the direction of the magnetic field turns for one rotation or a plurality of rotations.

15. The rotational angle measurement apparatus according to claim 14,
wherein the signal processing unit includes a window function processing unit that multiplies the ratio Vy/Vx calculated in the ratio-calculation unit by a window function W(r) having the ratio r (=Vy/Vx) as an argument,
and the averaging unit calculates an average value of the output from the window function processing unit for the duration in which the direction of the magnetic field turns for one rotation or a plurality of rotations.

16. A rotational angle measurement apparatus comprising:
a magnetic sensor that includes first and second bridges each comprising magneto-resistance elements each having a pinned magnetic layer; and
a signal processing unit that receives an output signal Vx from the first bridge as an input signal Vx and an output signal Vy from the second bridge as an input signal Vy and outputs an angle of magnetic field θ,
wherein the signal processing unit includes an averaging unit that calculates a correction parameter β from an average value of a ratio Vy/Vx of the input signals for the duration in which the direction of the magnetic field turns for one rotation or a plurality of rotations.

17. The rotational angle measurement apparatus according to claim 16,
wherein the signal processing unit includes a window function processing unit that multiplies a ratio Vy/Vx calculated by the ratio-calculation unit by a window function W(r) having the ratio r (=Vy/Vx) as an argument,
and the averaging unit calculates an average value of the output from the window function processing unit for the duration in which the direction of the magnetic field turns for one rotation or plurality of rotations.

18. The rotational angle measurement apparatus according to claim 16, further comprising
an offset-subtraction unit that subtracts predetermined offsets bx and by from the output signal Vx of the first bridge and the output signal Vy of the second bridge respectively,
wherein output signals from the offset-subtraction unit is inputted to a ratio-calculation unit of the signal processing unit.

19. The rotational angle measurement apparatus according to claim 18,
wherein the magnetic field is turned at a constant angular velocity for (n+m) rotations, the values n, m being an integer of 1 or greater,
wherein the averaging unit determines the offset voltages bx and by during n rotation duration in the duration,
wherein the offset-subtraction unit calculates values Vx'=Vx−bx and Vy'=Vy−by obtained by subtracting the offset voltages bx and by from the signals Vx and Vy respectively during m rotation duration, and
wherein the averaging unit determines the correction parameter β from the values Vx' and Vy'.

20. The rotational angle measurement apparatus according to claim 16,
wherein the magneto-resistance element is a giant magneto-resistance element.

* * * * *